(12) United States Patent
Klier

(10) Patent No.: US 7,313,555 B2
(45) Date of Patent: Dec. 25, 2007

(54) METHOD FOR COMPUTING THE MINIMUM EDIT DISTANCE WITH FINE GRANULARITY SUITABLY QUICKLY

(75) Inventor: Peter Klier, Sunnyvale, CA (US)

(73) Assignee: Anácapa North, Sunnyvale, CA (US)

( * ) Notice: Subject to any disclaimer, the term of this patent is extended or adjusted under 35 U.S.C. 154(b) by 457 days.

(21) Appl. No.: 11/119,509

(22) Filed: Apr. 28, 2005

(65) Prior Publication Data

US 2005/0267885 A1    Dec. 1, 2005

Related U.S. Application Data

(60) Provisional application No. 60/567,362, filed on Apr. 30, 2004.

(51) Int. Cl.
  *G06F 17/30*  (2006.01)
(52) U.S. Cl. .......................................... 707/6; 707/100
(58) Field of Classification Search ...................... None
  See application file for complete search history.

(56) References Cited

U.S. PATENT DOCUMENTS

| | | | |
|---|---|---|---|
| 5,459,739 A | 10/1995 | Handley et al. | |
| 6,119,120 A | 9/2000 | Miller | |
| 6,349,296 B1 | 2/2002 | Broder et al. | |
| 6,446,068 B1 | 9/2002 | Kortge | |
| 2003/0195890 A1 | 10/2003 | Oommen | |

OTHER PUBLICATIONS

Davi De Castro et al., Automatic Web News Extraction Using Tree Edit Distrance, In Proc. 13th Intl. Conf. on the World Wide Web, 2004, pp. 502-511, New York.

Saurabh Mittal, Implementation of K-shortest Path Dijkstra Algorithm used in All-optical Data Communication Networks, SIE 546 project, Spring 2004, Arizona.

T. Batu et al., A Sublinear Algorithm for Weakly Approximating Edit Distance, Proc. 35th Annual ACM Symposium on Theory of Computing, 2003, p. 359.

Richard Sproat, Ling 306, Introductio nto Computational Linguistics, Sep. 2003, Univ. of IL Urbana-Champaign http://www.staff.uluc.edu/~rws/Courses/L306, all pages.

Serge Dulucq et al., Analysis of Tree Edit Distance Algorithms, Proc. 14th Annual Symp. on Comb. Pattern Matching ,Jun. 2003, pp. 89-95, Morella, Mexico.

Philip Bille, Tree Edit Distance, Alignment Distance and Inclusion, Technical Report TR-2003-23 in IT Univ. Tech.Report Series, Mar. 2003, Univ. of Copenhagen, Denmark.

Michael Strube et al., The Influence of Minimum Edit Distance on Reference Resolution, In: Empirical Methods in Natural Language Processsing, 2002, pp. 312-319.

(Continued)

*Primary Examiner*—Charles Rones
*Assistant Examiner*—Belix M Ortiz
(74) *Attorney, Agent, or Firm*—Robert Moll

(57) ABSTRACT

This invention related to a method for computing the minimum edit distance, measured as the number of insertions plus the number of deletions, between two sequences of data, which runs in an amount of time that is nearly proportional to the size of the input data under many circumstances. Utilizing the A* (or A-star) search, the invention searches for the answer using a novel counting heuristic that gives a lower bound on the minimum edit distance for any given subproblem. In addition, regions over which the heuristic matches the maximum value of the answer are optimized by eliminating the search over redundant paths. The invention can also be used to produce the edit script. The invention can be modified for other types of comparison and pattern recognition.

18 Claims, 17 Drawing Sheets

OTHER PUBLICATIONS

L. Allison, Dynamic Programming Algorithm (DPA) for Edit Distance http://www.csse.monash.edu.au/~lloyd/tildeAlgDS/Dynamic/Edit, 1999, Monash University, Australia.

Ning Xu, Global and Local Alignment via Dynamic Programming, 1999.

Andrew Tridgell et al., The Rsync Algorithm, http://samba.anu.edu.au/rsync/tech_report ACT 0200, Australian National University, Jun. 1996, Canberra, Australia.

Eugene W. Myers, An O(ND) Difference Algorithm and Its Variations. Algorithmica, 1986, pp. 1-15.

James W. Hunt et al., A Fast Algorithm for Computing Longest Subsequences. Communications of the ACM, May 1977, pp. 350-353 vol. 20, No. 5.

Michael Gilleland, Levenshtein Distance, In Three Flavors, Meriam Park Software, www.merriampark.com/id.htm, pp. 1-12, 2004-2005.

Anoop Sarkar, Multiple Sequence Alignment: A Brief Introduction. for CMPT-825: Natural Language Processing, pp. 1-3, Sep. 15, 2003.

Thomas Gagne et al., Smalltalk Pattern Matching, pp. 1-10, Nov. 11, 2004.

| string | Heuristic vector | "" [a:0;b:0;c:0;d:0] | "b" [a:0;b:1;c:0;d:0] | "bc" [a:0;b:1;c:1;d:0] | "bcd" [a:0;b:1;c:1;d:1] |
|---|---|---|---|---|---|
| "" | [a:0;b:0;c:0;d:0] | 2 + 0 = 2 | 3 + 1 = 4 | 4 + 2 = 6 | 3 + 3 = 6 |
| "a" | [a:1;b:0;c:0;d:0] | 1 + 1 = 2 | 2 + 2 = 4 | 3 + 3 = 6 | 2 + 4 = 6 |
| "ab" | [a:1;b:1;c:0;d:0] | 2 + 2 = 4 | 1 + 1 = 2 | 2 + 2 = 4 | 1 + 3 = 4 |
| "abc" | [a:1;b:1;c:1;d:0] | 3 + 3 = 6 | 2 + 2 = 4 | 1 + 1 = 2 | 0 + 2 = 2 |

FIGURE 12

| string | [G A T C] | " " [0 0 0 0] | "G" [1 0 0 0] | "GT" [1 0 1 0] | "GTT" [1 0 2 0] | "GTTG" [2 0 2 0] | "GTTGA" [2 1 2 0] |
|---|---|---|---|---|---|---|---|
| [G A T C] | [0 0 0 0] | 4+0=4 | X | | | | |
| "G" | [1 0 0 0] | X | 4+0=4 | X | | | |
| "GA" | [1 1 0 0] | | 3+1=4 | X | | | |
| "GAT" | [1 1 1 0] | X | X | 3+1=4 | X | | |
| "GATT" | [1 1 2 0] | | | X | 3+1=4 | | |
| "GATTA" | [1 2 2 0] | | | 3+3=6 | 2+2=4 | Z | X |
| "GATTAC" | [1 2 2 1] | | | 2+4=6 | 1+3=4 | 0+4=4 | X |
| "GATTACA" | [1 3 2 1] | | | | | X | 0+4=4 |

FIGURE 13

METHOD FOR COMPUTING THE MINIMUM EDIT DISTANCE WITH FINE GRANULARITY SUITABLY QUICKLY

This application claims the benefit of provisional U.S. Application No. 60/567,362, entitled: Method for Computing the Minimum Edit Distance with Fine Granularity Suitably Quickly to be Known by the Acronym Yameda and its accompanying CD-ROM, filed on Apr. 30, 2004, which is incorporated by reference herein.

BACKGROUND

The present invention relates to methods for computing the minimum edit distance and at times will be referred to by the name "Yameda" which is an acronym for "Yet Another Minimum Edit Distance Algorithm."

This application also incorporates by reference herein as follows:

James W. Hunt, Thomas G. Szymanski: A Fast Algorithm for Computing Longest Subsequences. 350-353 Communications of the ACM (CACM), Volume 20, Number 5, May 1977;

E. Myers. An O(ND) difference algorithm and its variations. Algorithmica, pages 251-266, 1986; and Andrew Tridgell, Paul Mackerras, The rsync algorithm, Department of Computer Science Australian National University Canberra, ACT 0200, Australia http://samba.anu.edu.au/rsync/tech_report/, circa 1998.

The Hunt and Szymanski method and its variations are in common use on every UNIX/LINUX user's desktop in the form of the "diff" command that can be typed in at the prompt. The "diff" command computes the minimum edit distance between two text files on a line-by-line basis. When confronted with a binary file, the "diff" command will print a message on the order of "binary files differ" without any more detailed information. The reason for this limitation is simple: The Hunt and Szymanski method requires a time of $O(R^2)$, where R is the number of elements being compared that are common to both files. In the case of a line-by-line comparison, the Hunt and Szymanski method is efficient because each line of text is relatively unique. However, the "diff" algorithm is inappropriate for comparing the same files byte-by-byte, because at that point the quadratic behavior becomes significant because R increases due to the small "alphabet," or set of unique symbols in the sequence being compared. For a line-by-line comparison the "alphabet" is the set of all lines in each file; for a byte-by-byte comparison, it is the set of all 256 possible bytes in the ASCII i.e., American Standard Code for Information Interchange. For files consisting of only printable characters, the inefficiency of "diff" increases and, for DNA sequences, R will be at least N/4, where N is the size of the problem.

On a UNIX/LINUX workstation, the quadratic behavior of "diff" can be made visible by comparing two files with the following contents:

File 1: A
<a large number of blank lines>
B
vs.
File 2: X
<a large number of blank lines, not necessarily the same length as above>
Z The number of blank lines in each file can be different. It is necessary to put unique lines at the beginning and the end of each of these files due to the optimization within "diff" that strips off the beginning and end of each file as long as they are the same.

A second method of Meier86 runs in O(ND), and for certain input data, can perform faster than the Hunt and Szymanski method, i.e., when the number of differences, D, are small. The Meier86 algorithm is efficient for small alphabets such as DNA bases or bytes. However, like "diff", the Meier86 algorithm can easily be made inefficient with the above example where there are a large number of differences: the first file would have, for instance, 10,000 blank lines and the second file would have, for instance, 20,000 blank lines. Thus, N, the problem size, is greater than or equal to 10,000 whereas D is also greater than or equal to 10,000, and thus the Meier86 method requires ND, or 100,000,000 steps. This becomes an obstacle, even in practice, as many edits consist of mostly insertions or deletions alone. In a nutshell, the Meier86 algorithm can be thought of as an instance of the Dijkstra algorithm for searching a graph of minimum edit distance subproblems, whereas Yameda is based instead on the faster-converging A* (pronounced A star) search algorithm or simply A* search.

A third method, the rsync algorithm, can be used for delta compression for the purpose of transmitting files. In this algorithm, some blocksize B is chosen (e.g., 1024 bytes) and a rolling checksum is computed for each byte position which summarizes the last 1024 bytes. Pairs of blocks that match using the rolling checksum are confirmed using a more powerful checksum, and thus the rsync algorithm can be used for delta-compressed transmission of information, i.e., over the Internet even when both files are not present.

However, the rsync algorithm does not solve certain problems. Rolling-checksum algorithms overestimates the number of differences, and if these differences are sprinkled about in the file at a density on the order of one per block size, the whole block will be sent, stored, or displayed as a difference rather than the smallest difference. Thus, the whole file may yet be sent or stored. If the block size is too small, there will be many false matches, and hence incorrect results.

Thus, algorithms such as rsync cannot be used for applications such as displaying the true minimum edit distance on the user's console to confirm that the edits are as expected, three-way merge of files in HTML, XML, rich text, or any other format, or for those applications where a high degree of delta-compression is desired, and/or it is likely that at least one difference will exist in every block.

SUMMARY OF THE INVENTION

The present invention relates to computing the minimum edit distance measured as the number of insertions plus the number of deletions, between two strings or sequences of integers. The minimum edit distance problem can be solved as a graph search when one considers each subproblem as a node in a graph. Here the term "graph" is used in the computer-science sense of the word. Each node in the graph corresponds to the problem of computing the minimum edit distance between two particular strings, and is connected to other nodes via one-character deletions or insertions on either or both strings. The minimum edit distance is then given as the shortest path, in such a graph, between the original problem and the comparison between the two empty strings. Edges are given a weight of 1 if they represent an insertion or deletion, and a weight of 0 if they represent a match. Each such node will be written as Dist(<string1>, <string2>).

For example, the children of Dist("qwerty", "qwertu") are Dist("qwert", "qwertu") and Dist("qwerty", "qwert"), with a distance of 1 between the original node and each of its children. On the other hand, if the last character matches, it can be stripped off with a distance of 0. For example, the child of Dist("qwert", "qwest") is Dist("qwer", "qwes") which is obtained by matching the 't' at the end of both strings. In the latter case there is no need to generate any other children, as they will not generate a shorter path.

For the endgame to this search strategy we note that Dist("", "") has no children, and if the empty string is involved, there is only one child obtained by stripping off the last character of the other string. For example, the child of Dist("", "qwer") is Dist("", "qwe") with an edge of length 1 between them, and symmetrically the child of Dist ("qwer", "") is Dist("qwe", "") with a length of 1 as well.

The total number of graph nodes obtained in such a fashion is m×n where m is the length of the first string and n is the length of the second string; by remembering the answer to each subproblem, a naive algorithm will always be able to solve this problem in O(mn), but this is still a quadratic algorithm.

The Yameda search algorithm can use the A* search algorithm with a heuristic and additional optimizations. The A* search algorithm is like the Dijkstra algorithm except that it requires a heuristic which gives a lower bound on the cost between any two nodes. This heuristic must compute an answer to the effect of "give me a number such that the shortest path between these two nodes is at least that far apart"; in other words, a lower bound. For example, an algorithm that computes the minimum travel distance, over roads, between any two given cities, can use as a heuristic the "as the crow flies" distance because, although the actual travel distance (i.e., the Manhattan distance) between two cities can be longer than the distance as the crow flies, it cannot be shorter. In fact, Dijkstra's algorithm is just the A* search algorithm with a plug-in heuristic of 0.

Yameda is based on the observation that such a lower bound can be computed quickly and to some degree of accuracy, especially over a small alphabet, using a counting heuristic $$\text{heur}(s, t) = \sum_{i=0}^{a-1} |C_{i,s} - C_{i,t}|$$

where 's' and 't' are the strings being compared, 'a' is the number of characters or symbols in the alphabet (e.g., for bytes, a=256; for DNA bases (G,A,T,C), a=4), $C_{i,s}$ represents how many times the ith member of the alphabet appears in the string s, and $C_{i,t}$ represents how many times the ith member of the alphabet appears in the string t.

The counting heuristic can be illustrated by the following examples:

In a first example, heur("qwerty", "wertyu") is 2 because: 1) there is 1 "q" in "qwerty" and zero "q" in "wertyu", which contributes 1 to the heuristic; 2) there are zero "u"s in "qwerty" and one "u" in "wertyu", which contributes 1 to the heuristic; 3) each of "w", "e", "r", and "t" contributes 0 to the heuristic; 4) there are no more of any other letter, which contributes 0 to the heuristic. In cases such as above, the heuristic is 100% accurate and Yameda will choose the correct path without any wasteful computation.

In a second example, heur("super", "supercalafragalistic") is 15 because characters are only inserted. In this case the heuristic is 100% accurate as well, and is equivalent to the length heuristic which is simply the absolute value of the difference of the lengths of two strings.

In a third example, heur("GATTACA", "GATATCAT") is 1 because the minimum edit script consists of 1 transposition, which does not count toward the total heuristic, and 1 insertion, which does. In this case the heuristic is only 50% accurate and may result in some 'wasteful' computation although some subproblems may not be so wasteful.

In a fourth example, heur("abc1234", "xyz1234") is 6 because each of a,b,c, and x,y,z do not occur in the other string, and the heuristic is 100% accurate. This is a special case where the heuristic can be used to eliminate the search over redundant paths.

Thus the counting heuristic, and even its approximation the length heuristic, can provide guidance to the A* search algorithm that is always a lower bound, which is required by A* search algorithm, and very often is close to the actual minimum edit distance that will be computed by any algorithm. Even in the case of edits such as transpositions that maximally "fool" the heuristic into underestimating the minimum distance, the counting heuristic is still at least as good as the length heuristic, which in and of itself is sufficient to yield linear-time behavior on the examples cited above.

There is a second optimization that Yameda performs which provides an additional advantage over Meier86, i.e., the elimination of redundant paths.

The problem with redundant paths is as follows. If we wish to compare the strings "1234abcdef" and "1234uvwxyz", from the counting heuristic we are clear the minimum edit distance is 12, and the heuristic is perfectly accurate. However, all subproblems yielding an answer of 12 will be exercised, yielding a quadratic amount of effort. For instance, the above example would yield the subproblems "1234abcde" vs. "1234uvwxyz", "1234abcdef" vs. "1234uvwxy", "1234abcde" vs. "1234uvwxy", "1234abcd" vs. "1234uvwxyz" . . . exercising all 36 combinations of stripping away the last 6 characters.

However, if we are only interested in one of the possible edit scripts, since they all carry the same penalty, it doesn't matter which one. It is just as useful to say "delete abcde and then insert uvwxy" as it is to say "delete abc, insert uvwxy, delete de" or any other combination.

The key is to search only the perimeter of such a region rather than its interior. This is the second feature of Yameda and ensures that, if the heuristic is perfect, Yameda will run in linear time. In addition, if, in the future, some heuristic is "plugged in" that is more accurate than the counting heuristic, this further improves the performance of Yameda.

The above perimeter searching can be implemented in a variety of ways if one is careful with the bookkeeping. To do so, the heuristic needs to be computed for the minimum distance between the nodes corresponding to Dist(s,t) and Dist(u,v), that is, four inputs instead of two inputs. The formula for this four-way heuristic is as follows:

$$\text{heur}(s, t, u, v) = \sum_{i=0}^{a-1} |(C_{i,s} - C_{i,u}) - (C_{i,t} - C_{i,v})|$$

Thus, to generate the child nodes of Dist(s,t), Yameda will continue to iterate, generating strings u and v that are substrings of s and t, until heur(s,t,u,v), which represents the lower bound on the edit distance, is equal to the upper bound, which is abs(length(s)−length(u))+abs(length(t)−length(v)).

One way to do this is to first generate u and v by stripping off the last character of s and t, and then continuing to strip off the last characters of u and v, while the above condition is true. When it fails to be true, one can continue by stripping off the last character of either u or v while the condition is true, until the condition fails to be true.

Once such a u and v have been found, then the child nodes and "known values" for the perimeter of the region being searched must be judiciously entered into the data structures that are being used to drive the A* search. The details are left to the implementation.

BRIEF DESCRIPTION OF THE DRAWINGS

FIG. 12 shows the heuristic values and their computation plus the known distance as if a full search were being performed. The shaded boxes indicate nodes that are visited by Yameda.

FIG. 13 illustrates an example of the application of the Yameda algorithm comparing a pair of DNA sequences.

DETAILED DESCRIPTION OF THE PREFERRED EMBODIMENTS

The following description includes the best mode of carrying out the invention, illustrates the principles of the invention, and should not be taken in a limiting sense. The sequence of steps illustrated in the flow charts and recited in the claims may be re-ordered and certain steps may be executed sequentially or in parallel to achieve the same results. The scope of the invention is determined by reference to the claims. Each part or step is assigned its own number in the specification and drawings.

The following equations are pertinent to the invention so will be introduced now but will be described in more detail below in connection with FIGS. 8 and 9, respectively:

$$\text{heur }(s,\ t) = \Sigma_{i=0}^{a-1} |C_{i,s} - C_{i,t}|$$

$$\text{heur }(s,\ t,\ u,\ v) = \Sigma_{i=0}^{a-1} |(C_{i,s} - C_{i,u}) - (C_{i,t} - C_{i,v})|$$

Figure 1:
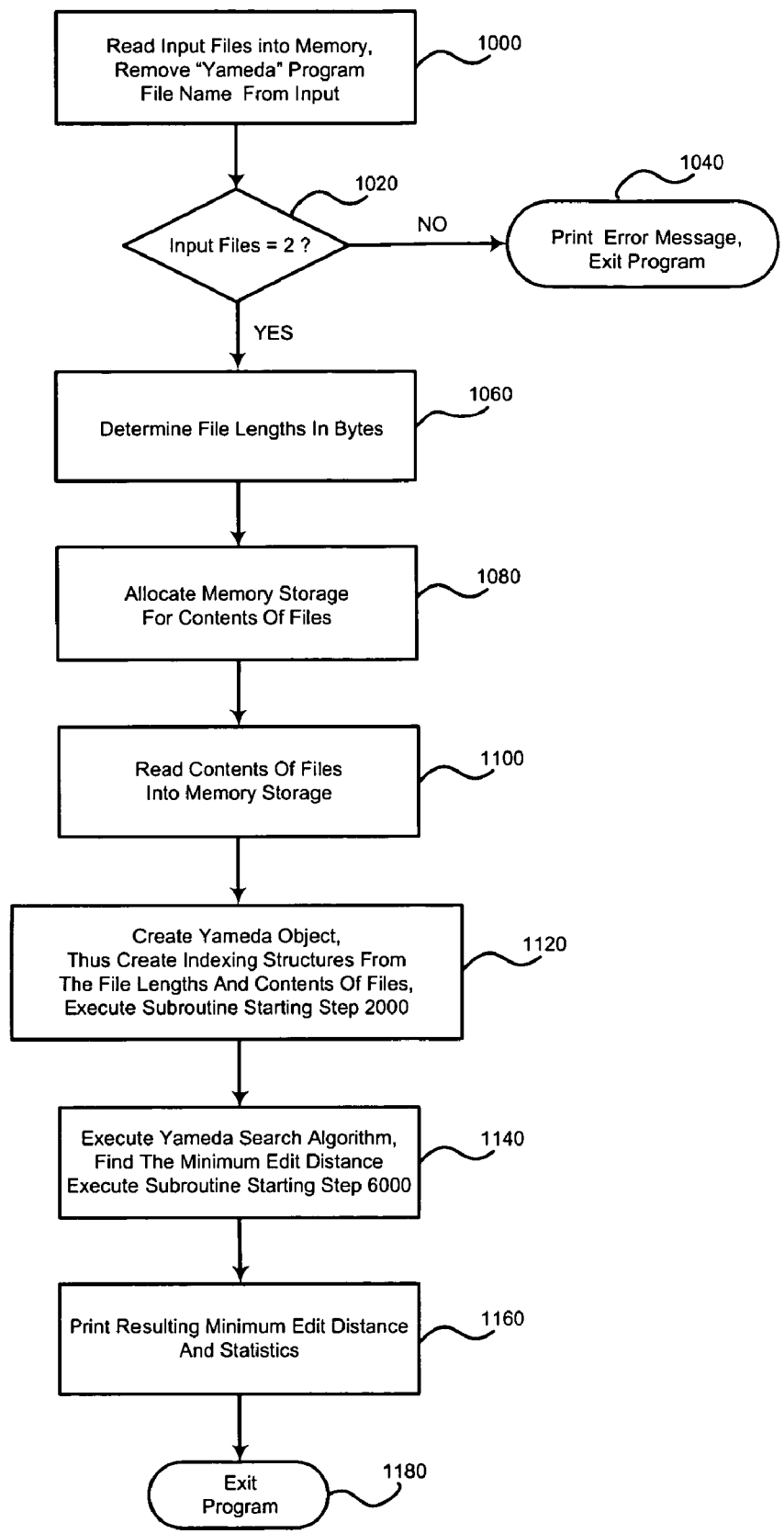
FIG. 1 illustrates the main routine, a computer implemented method, which invokes the Yameda algorithm to search for minimum edit distance between two strings or sequences of integers s and t.

FIG. 1 illustrates the main routine which invokes the Yameda algorithm to search for the minimum edit distance between two strings or sequences of integers s and t by reading two files into memory and determining their lengths, calling subroutines to create a Yameda data object, and computing and printing the minimum edit distance. Step 1000 removes the program file name "Yameda" from the command line input that the user typed. Step 1020 checks that exactly two filename arguments are supplied for comparison. Step 1040 prints an error message if there are not exactly two filename arguments. Step 1060 finds out how big, in bytes, each of the files are. Step 1080 allocates storage so that each of the two files can be read into memory. Step 1100 reads the contents of the two files into memory. Step 1120 creates a Yameda data object, calls the algorithm of FIG. 2 and initializes all data structures that are referred to during search, particularly the heuristic vectors. Step 1140 executes a search and calls the algorithm of FIG. 6. The search finds the shortest path using the A* search algorithm. Step 1160 prints the resulting minimum edit distance. Step 1180 exits the program.

Figure 2:
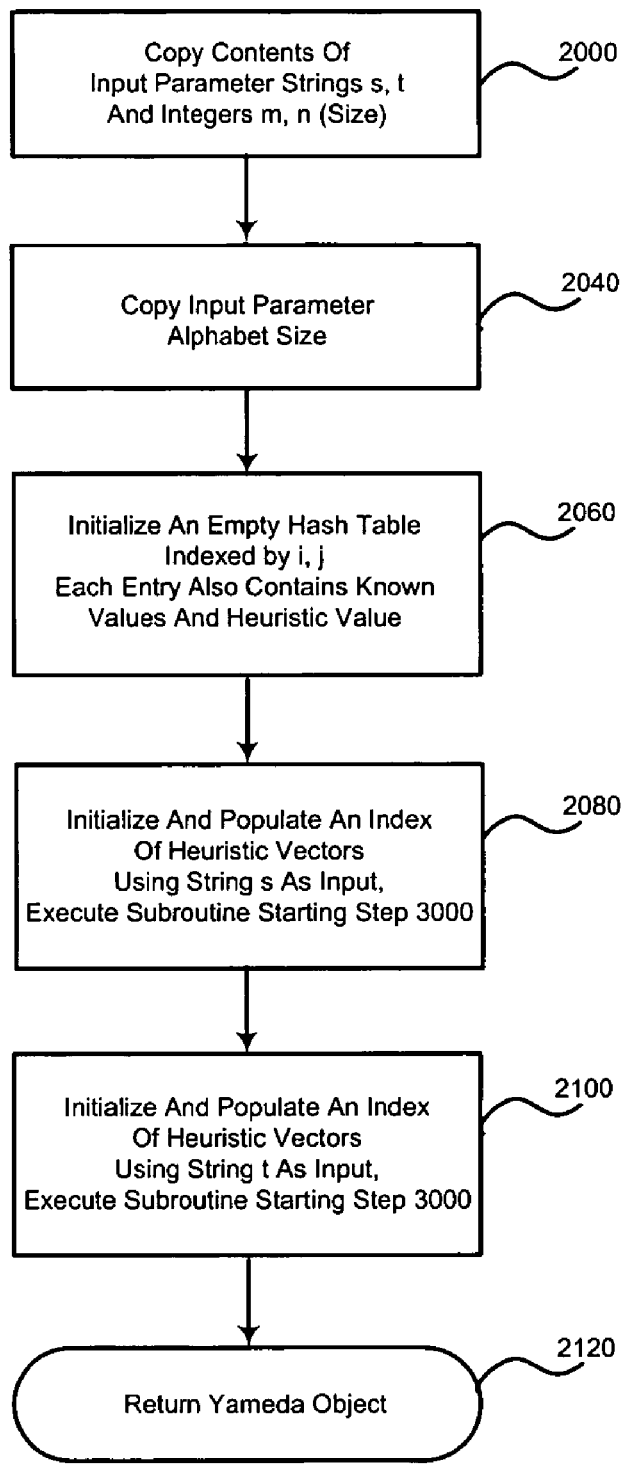
FIG. 2 illustrates the constructor for the Yameda object which sets up data structures required to run the algorithm in FIG. 6.
Figure 6:
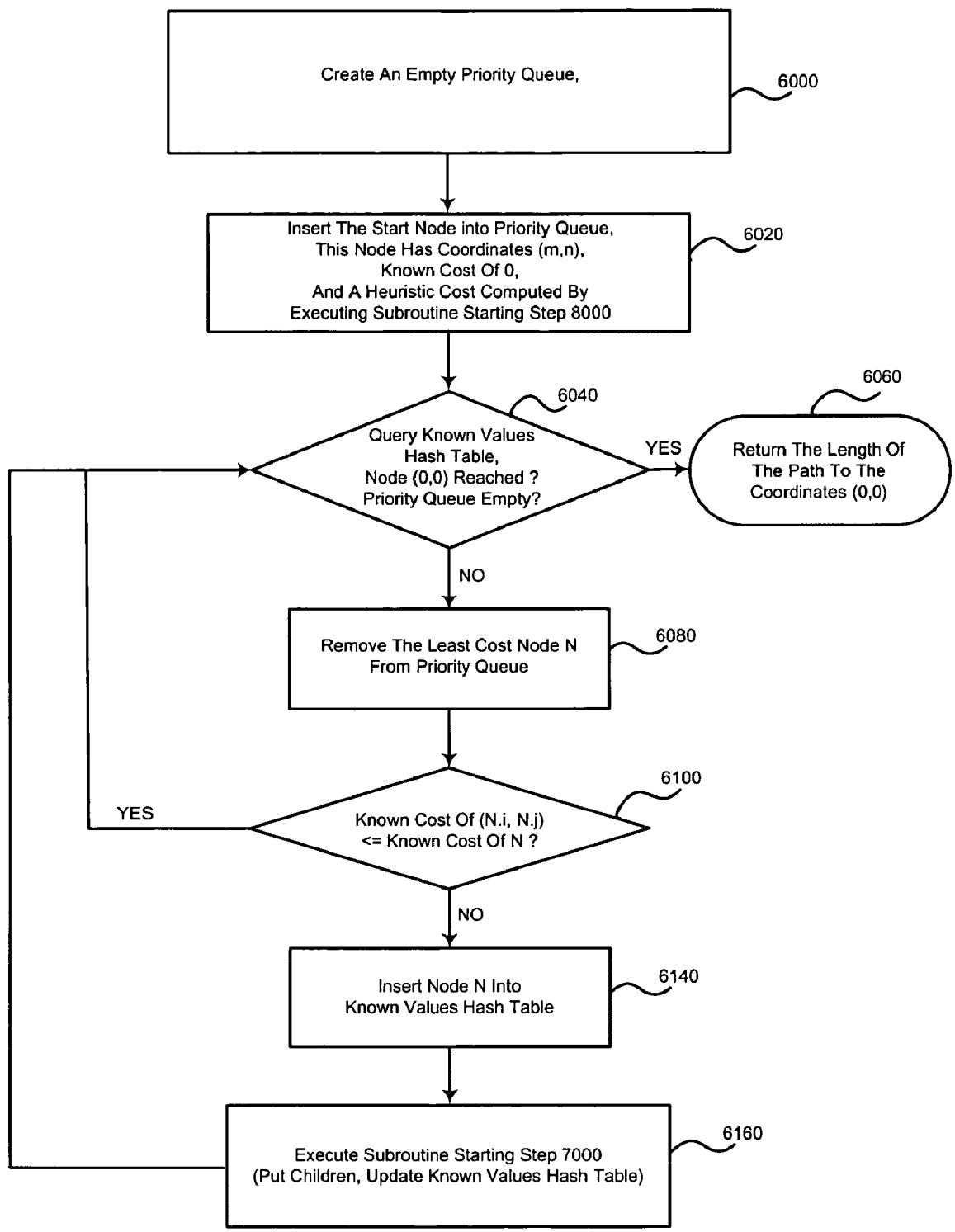
FIG. 6 illustrates a subroutine of FIG. 1, which executes the A* search to solve for the minimum edit distance of the two strings.

FIG. 2 illustrates the constructor for the Yameda object which sets up data structures required to run the algorithm in FIG. 6. FIG. 2 creates indexing structures which will be referred to during the search. Both of the input files are indexed so that the heuristic function can be evaluated quickly. A table is allocated to hold information about paths with known lengths from the start. Step 2000 makes a copy of the inputs for future reference, namely, the contents of the files, input parameter strings s, t, and their lengths m, n for future reference. Step 2040 makes a copy of the alphabet size (one of the inputs) for future reference. The value of the alphabet size is typically 256, for DNA sequences, this value might be 4. If this value is 1 then it reduces to the length heuristic. Step 2060 initializes an empty hash table which will hold the paths to which the minimum edit distance is known. This table is indexed by (i,j) representing the first i bytes of s versus the first j bytes of t. This table will be updated during the execution of FIG. 6. Step 2080 initializes and populates an index of heuristic vectors using string s as the input and calls FIG. 3. Step 2100 initializes and populates an index of heuristic vectors using string t as the input and calls FIG. 3. Neither of these indexes, produced in steps 2080 and 2100, will be modifiable during the remainder of the execution. Step 2120 returns the Yameda object to the caller. All of the data produced in this flowchart will be preserved until the caller deletes the object so created, explicitly or implicitly by going out of scope.

Figure 3:
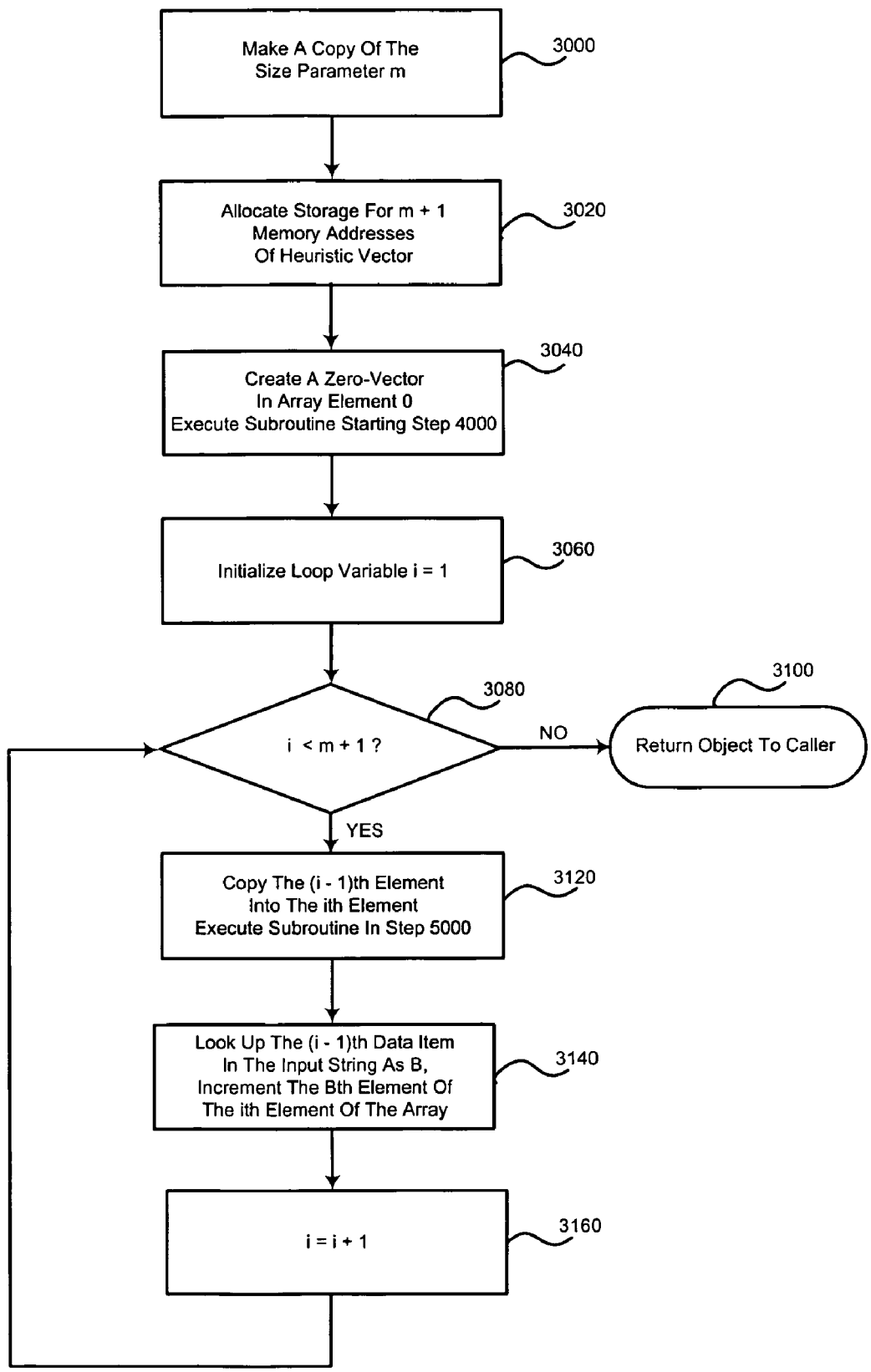
FIG. 3 implements a subroutine of Yameda implemented in FIG. 2 to generate a data structure with either $C_{i,s}$ or $C_{i,t}$ as the outputs.

FIG. 3 implements steps 2080 and 2100 in FIG. 2. This flowchart creates an index of heuristic vectors for the given input data. This will yield an array of arrays such that, given a position in the input string and a byte value, the lookup yields the count of that byte value up to that position. It accomplishes this as follows: it allocates an array of the appropriate size (m+1), sets the 0th element of the array to the zero vector of (typically 256) values. Every subsequent array element is created by copying the previous element, finding the current character in the string, and then incrementing the appropriate number. Step 3000 makes a copy of the size parameter m. Step 3020 allocates storage for (m+1) memory addresses. The initial value of each memory address will be "0" or NULL. Step 3040 creates a zero-vector of (typically 256) values and puts it into array element 0 by calling FIG. 4. Step 3060 initializes loop variable i to 1. Step 3080 tests whether i is less than (m+1). If yes, the subroutine continues at step 3120. If no, the subroutine exits at step 3100, where it returns the object to the caller. All of the data produced in this flowchart is preserved until the caller deletes the object so created, explicitly or implicitly by going out of scope. Step 3120 copies the (i-1)th element of the array, putting the result into ith element by calling FIG. 5. These elements are both vectors of integers. Step 3140 looks up the (i-1)th data item in the input file (typically a byte of data) and uses this byte, call it B, as an index, and increments the Bth element of the ith element of the array (i.e., essentially a two-dimensional lookup). Step 3160 increments i by 1.

Figure 4:
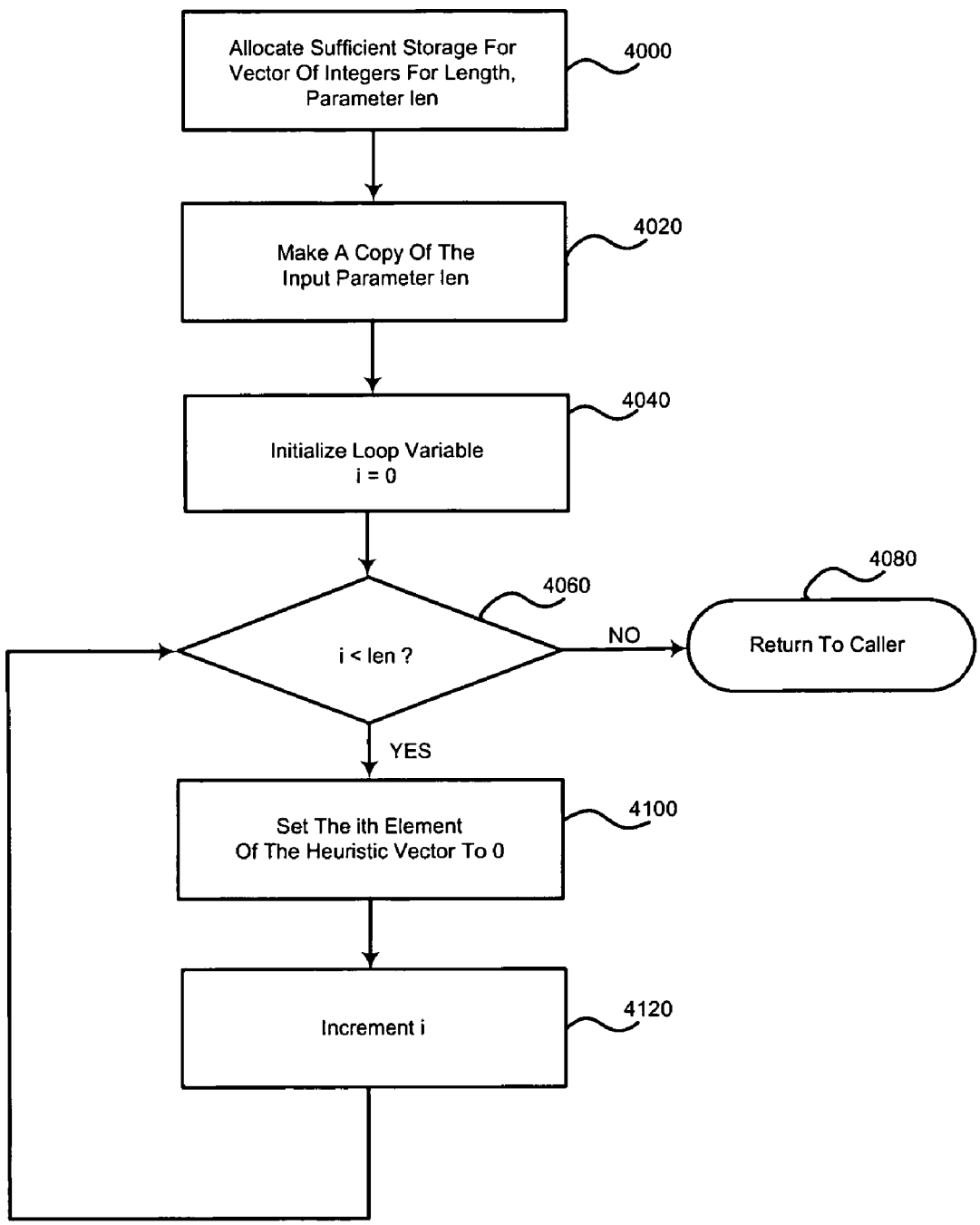
FIG. 4 illustrates an algorithm to generate an array of integers populated with zeroes.

FIG. 4 implements step 3040 of FIG. 3. This flowchart allocates a vector of integers and populates this vector with zeros. The size of the vector is given by the input datum. Step 4000 allocates storage sufficient to hold the vector of integers. Its size will be len, which is the sole input to this flowchart. Step 4020 makes a copy of the input size parameter len. Step 4040 initializes a loop variable, i, to 0. Step 4060 tests whether i is less than len. If yes, the routine continues at step 4100. If no, the routine exits at step 4080. Step 4080 returns the object to the caller. All of the data produced in this flowchart will be preserved until the caller deletes the object so created, explicitly or implicitly by going out of scope. Step 4100 sets the ith element of the array storage to 0. Step 4120 increments i.

Figure 5:
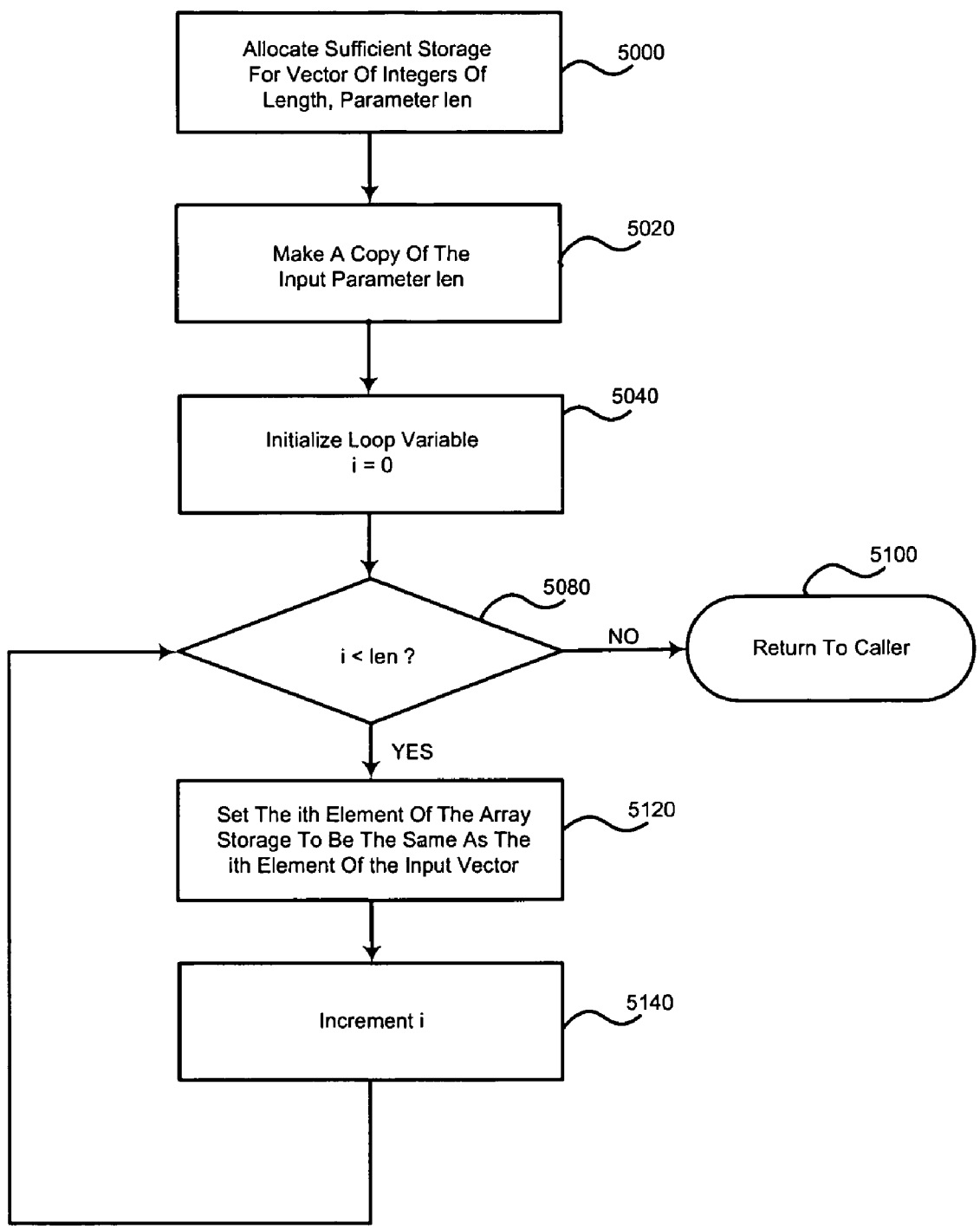
FIG. 5 illustrates an algorithm to copy an array of integers.

FIG. 5 implements step 3120 of FIG. 3. The purpose of this flowchart is to make a vector of integers which is a copy of the input vector, albeit with freshly-allocated storage. Step 5000 allocates storage sufficient to hold the vector of integers. Its size will be the same as the size of the input vector. Step 5020 finds the length of the input vector and make a copy of this length. Step 5040 initializes a loop variable, i, to 0. Step 5080 tests whether i is less than len. If yes, the routine continues at step 5120. If no, the routine exits at step 5100. Step 5100 returns the object to the caller. All of the data produced in this flowchart will be preserved until the caller deletes the object so created, explicitly or implicitly by going out of scope. Step 5120 sets the ith element of the array storage to be the same as the ith element of the input vector. Step 5140 increments i.

FIG. 6 implements step 1140 of FIG. 1. This flowchart executes the A* search algorithm where the heuristic function is implemented by the counting heuristic formula using the result of FIG. 3 as input. The A* search algorithm is a best-first search which iteratively extends the shortest path from the start node to anywhere until the goal node is reached. The notion of "shortest" is given by the length so far plus the heuristic value. The start node corresponds to the comparison of the whole of the first input file or string with the whole of the second input file or string. The goal node corresponds to the comparison of the empty file or string with the empty file or string. Step 6000 creates an empty priority queue. The fundamental property of this data structure is that items can be placed into the priority queue in any order, but when an item is removed, the "least" item (as defined by the less-than "<" operator) is always removed first. Each item in the priority queue contains the following data:

i, the first coordinate (a location in the sequence being compared);
j, the second coordinate (a location in the second sequence being compared);
known cost, the cost of the path from the start node to (i,j); and
heur_, the heuristic lower-bound cost of the path from (i,j) to the goal node (0,0);
The priority queue is sorted by the sum of known cost and heur_.

Step 6020 inserts the start node into priority queue. The start node corresponds to the comparison of the whole of the first input file or string with the whole of the second input file or string. The start node's coordinates are (m,n) where m is the length of the first file or string, and n is the length of the second file or string the routine then calls FIG. 8 to compute the value of the heuristic. Step 6040 determines whether the goal node (0,0) has been reached by querying the known values hash table created in FIG. 2. Second, step 6040 determines whether the priority queue is empty. If either of the above conditions are TRUE, the routine exits at step 6060. If both of the above conditions are FALSE, the routine continues looping at step 6080. Step 6060 returns the length of the path to the coordinates (0,0) which is now known. This is accomplished by querying the known value hash table, which was populated during the execution of this flowchart. Step 6080 removes the least cost node, N, from the priority queue. The cost of each node for this purpose is the known_cost plus the heur_cost for each node. The least-cost removal operation (and insertion) is implemented using a standard, public-domain "binary heap" data structure that is not flowcharted (neither is the hash table) but which can be found in any textbook, and for which the source code is provided in yaprioq.h and yaprioq.cpp. Step 6100 tests whether the location of N has already been reached, prior to this iteration, by another path, and if so, whether this other path is cheaper than N, and if so, discards N by continuing the loop at step 6040 without expanding the children of N. The "cheaper" criterion is the length of the path from the start node, excluding the heuristic value. Step 6140 marks the node, N, as "known" by inserting it into the known values hash table. This is the same hash table that is queried at step 6040. Step 6160 puts zero, one, or more children of N into the priority queue. In the process of doing so, the "known" nodes may be updated. Various techniques are employed (see FIG. 7A to 7E) including box-formation and stripping off common substrings at the end. The children of N always represent a subproblem that is simpler than N itself as each node corresponds to a comparison between two strings. Each of the children corresponds to a comparison between two substrings of N, one of which must be shorter as determined by call to FIG. 7A.

FIG. 7A to 7E implements step 6160 of FIG. 6. This flowchart, given N, puts the children of N (smaller subproblems) back onto the priority queue. These children are chosen judiciously so as to save execution time of the algorithm. In particular, two major optimizations are used. The first is to strip off the common suffix, if any, of the strings being compared. The second is to strip off suffixes, as long as there are no common characters in these suffixes, which is the box-formation of Yameda. As one of these two optimizations is executed, care is taken with boundary conditions (i.e., one of the coordinates is 0), and items are placed into the known values hash table. Step 7000 extracts the i-coordinate from N. Call it "i". Step 7020 extracts the j-coordinate from the node N. Call it "j". Step 7040 extracts the "known cost" field of N. Call it known cost. Step 7080 tests whether i=0 AND j=0. If both coordinates are 0, step 7100 exits the routine without doing anything since N is the goal node (0,0) representing the comparison of the empty string with the empty string and no children. Otherwise, the routine continues at step 7120. Step 7120 tests whether i=0. If TRUE, the routine goes to step 7140 which adds one child and exits the routine. If FALSE, the routine continues at step 7180. Step 7140 adds a new node to the priority queue with coordinates (i,j-1). Since i=0, N has only one child which is obtained by stripping off the last character of the second string. Eventually this will reach (0,0). Step 7140 calls FIG. 8 to compute the value of the heuristic. Step 7160 exits the FIG. 7A flowchart. The main loop of FIG. 6 will continue with the least cost node, N, from the priority queue including the node just placed. Step 7180 tests whether j=0. If TRUE, the routine continues at step 7200 which adds one child and exits the routine. If FALSE, the routine continues at step 7240. Step 7200 adds a new node to the priority queue with coordinates (i-1,j). Since j=0, the node N has only one child which is obtained by stripping off the last character of the first string. Eventually this will reach (0,0). Step 7200 calls FIG. 8 to compute the value of the heuristic. Step 7220 exits the FIG. 7A flowchart. The main loop of FIG. 6 will continue with the least cost node, N, from the priority queue including the one just placed. Step 7240 tests whether the characters at the (i-1,j-1) position are equal. If TRUE, the routine continues at step 7260. If FALSE, the routine continues at step 7460 in FIG. 7C. Step 7260 in FIG. 7B initializes loop variable, n, to 1. This variable will increment while we are stripping off the last characters that are equal. Step 7280 tests whether the characters at the (i-n,j-n) position are equal (and the indices are in range). If TRUE, the routine continues the loop at step 7320 which increments n by 1. If FALSE, the routine breaks out of the loop at step 7300. Step 7300 decrements n by 1. Step 7340 adds a new node to the priority queue. This node has coordinates (i-n,j-n) and represents the subproblem of N after stripping off common suffixes. Step 7360 initializes a loop variable, M, to 1. M will be used to add all of the intermediate nodes that were tested to the known_ hash table. Step 7380 tests whether M<n. If TRUE, it continues at step 7420. If FALSE, it exits from the routine at 7400. Step 7400 exits from FIG. 7B and pops back to FIG. 6. The child of N has been put onto the priority queue, and the intermediate nodes along the diagonal have been added to the known value hash table. Step 7420 inserts the location (i-M,j-M) into the known_ hash table using the same known cost and heuristic cost as N. Step 7440 increments M.

Figure 7A:
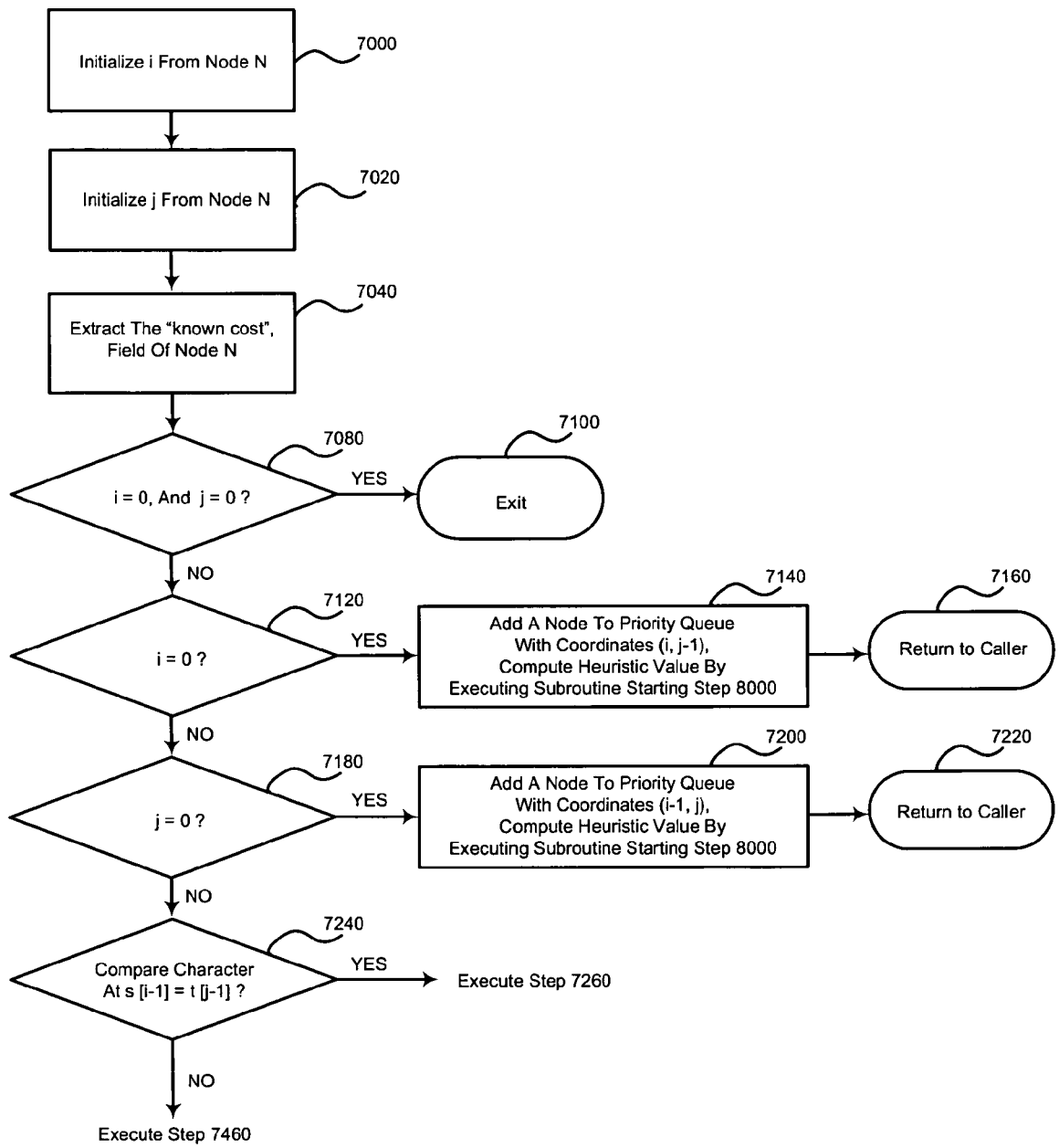
FIG. 7A is a subroutine of Yameda implemented in FIG. 6 to put the children nodes N into the priority queue and to the list of the known nodes.
Figure 7B:
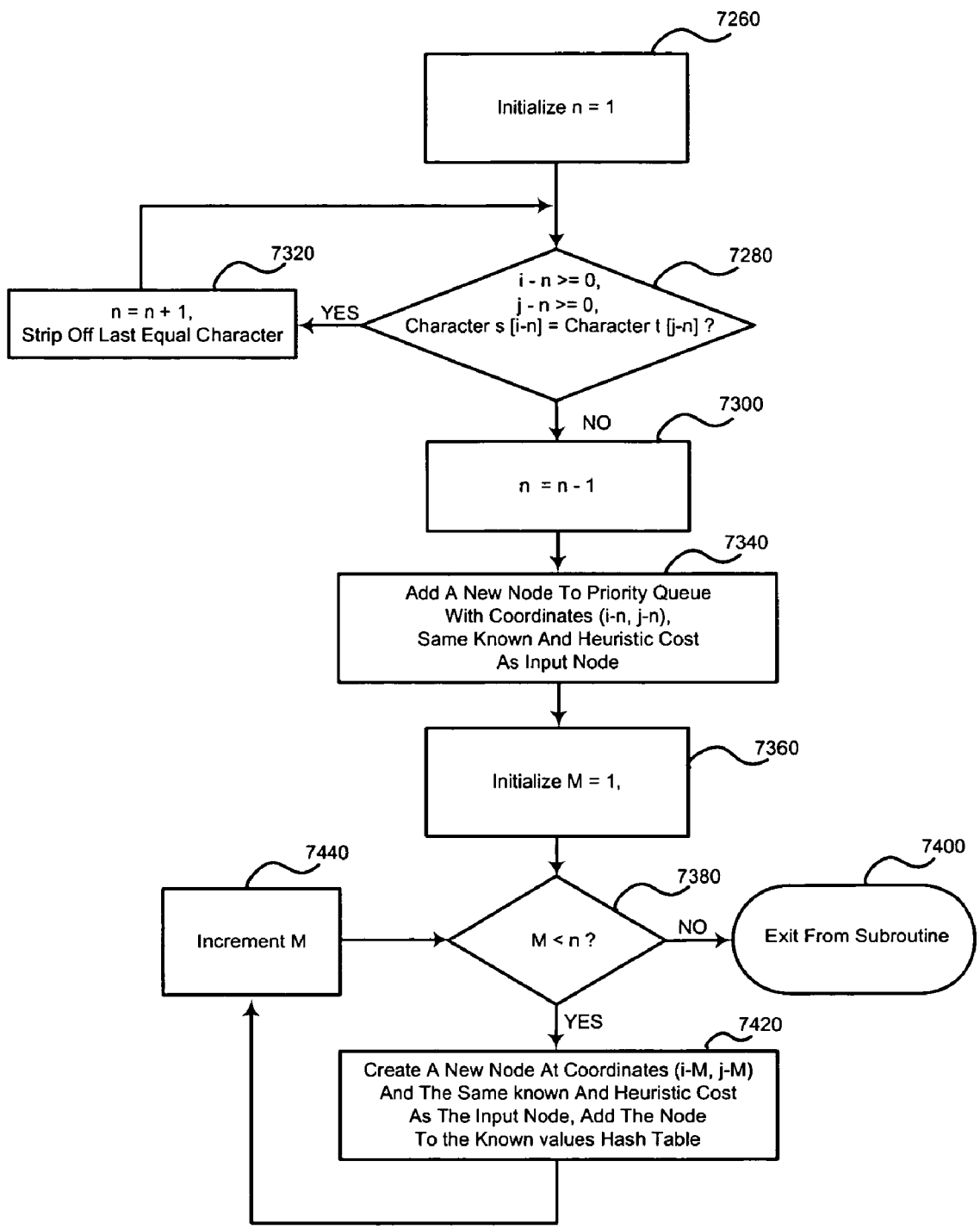
FIG. 7B is a continuation of the subroutine of FIG. 7A to remove the common substrings at the end of each string.
Figure 7C:
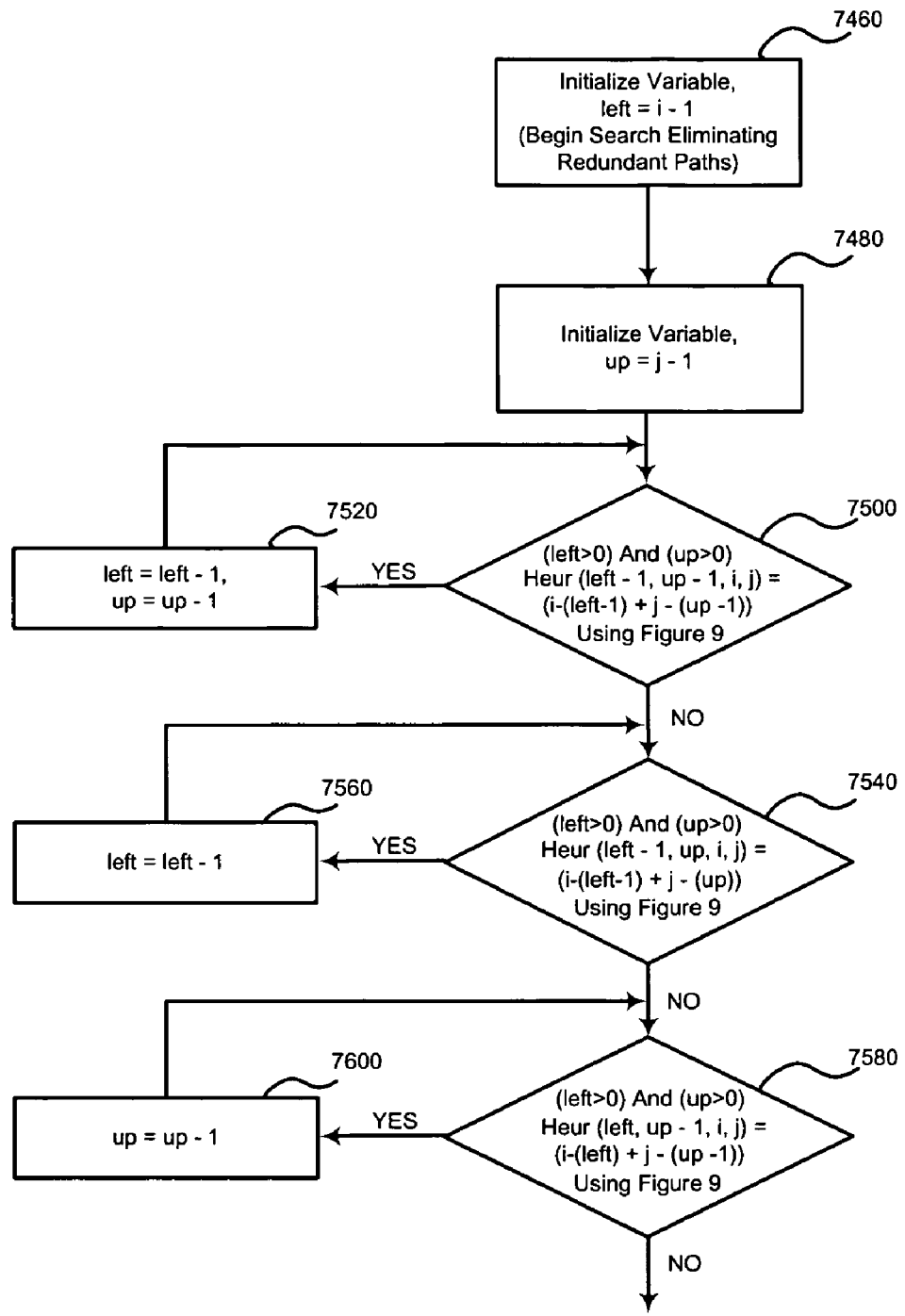
FIG. 7C is a continuation of the subroutine of FIG. 7B to eliminate redundant paths until a region is reached where all the characters between the two strings are all different.

The routine continues to step 7460 of FIG. 7C where it initializes a loop variable, left, to i-1. This is the first coordinate and begins the novel search for a "box" that eliminates redundant paths. Step 7480 initializes a loop variable, up, to j-1. This is the second coordinate of the box. Step 7500 tests whether the four-way heuristic between (left-1, up-1) and (i,j) is equal to the Manhattan distance between these points. If so, the lower bound is equal to the upper bound and thus any search between (i,j) and (left-1, up-1) would be redundant. Boundary conditions are also checked. This uses the novel four-way heuristic in FIG. 9. If TRUE, it continues the loop at step 7520. If FALSE, it exits the loop and goes to step 7540. Step 7520 decrements (decrease by 1) both left and up, thus making the box bigger, a larger square. Step 7540 tests whether the four-way heuristic between (left-1,up) and (i,j) is equal to the Manhattan distance between these points. If so, the lower bound is equal to the upper bound and thus any search between (i,j) and (left-1,up) would be redundant. Boundary conditions are also checked. This uses the novel four-way heuristic in FIG. 9. If TRUE, it continues the loop at step 7560. If FALSE, it exits the loop and goes to step 7580. Step 7560 decrements (decrease by 1) left, thus extending the square into a rectangle. Step 7580 tests whether the four-way heuristic between (i,j) and (left, up-1) is equal to the Manhattan distance between these points. Boundary conditions are also checked. This uses the novel four-way heuristic in FIG. 9. If TRUE, it continues the loop at step 7600. If FALSE, it exits the loop at step 7620. The two suffixes that can be stripped off have been found. All of the characters in one suffix are different from all of the characters in the other suffix. Step 7600 decrements (decrease by 1) up. In step 7620, leftover is defined as i-left, the difference between i and left. In step 7640, upover is defined as j-up, the difference between j and up. Leftover and upover represent the number of characters being stripped off the end of the first string and the second string, respectively. Step 7680 inserts a node into the priority queue with coordinates at (left, j) and calls FIG. 8 to compute the value of the heuristic. Step 7700 insert a node into the priority queue with coordinates at (i,up). These two nodes are the only ones that need to be inserted into the priority queue for the algorithm to reach (left, up) and insert all the nodes in between. i, j has only these two children, and the process of inserting the known values into known value hash table now begins as well as a call to FIG. 8 to compute the value of the heuristic.

Figure 7D:
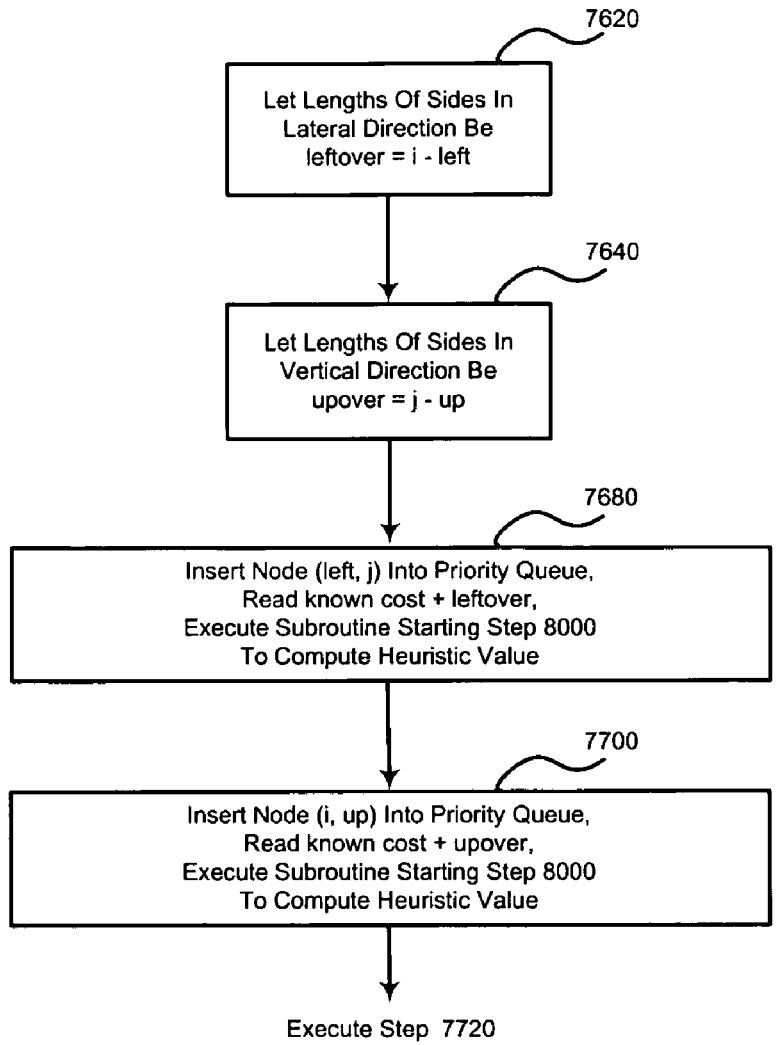
FIG. 7D is a continuation of the subroutine of FIG. 7C to put the lower left and upper right child nodes of the region onto the priority queue to generate children nodes including computing the heuristic value of each node.
Figure 7E:
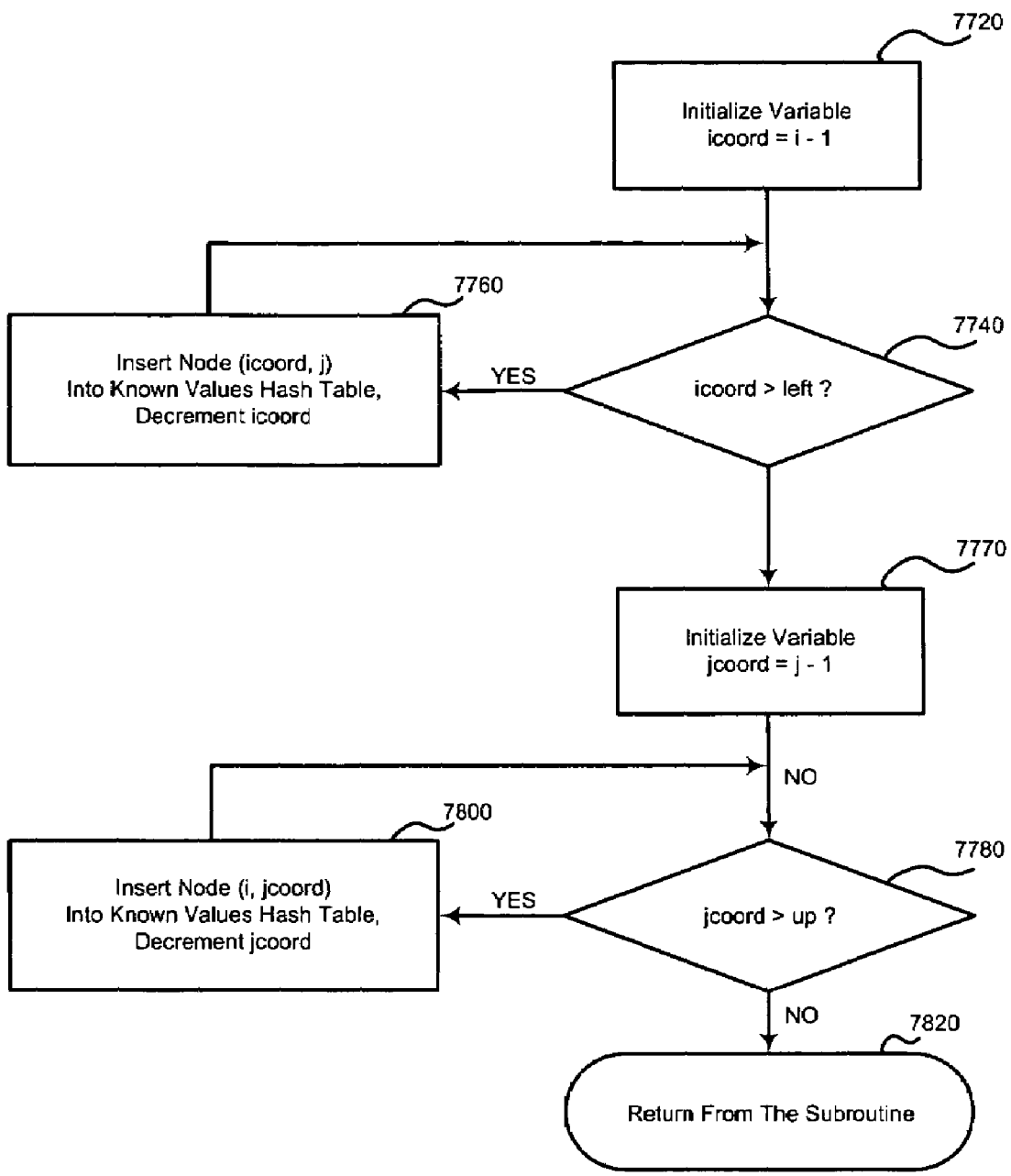
FIG. 7E is continuation of subroutine of FIG. 7D to put the perimeter of the region into the known values hash table so that future paths will stop if they reach this particular region.

Step 7720 in FIG. 7E initializes loop variable icoord to i-1. Step 7740 tests whether icoord is greater than left. Step 7760 inserts the node at (icoord, j) into the table of known values. Step 7780 tests whether jcoord is greater than up. Step 7800 inserts the node at (i,jcoord) into the table of known values. Step 7820 returns from FIG. 7 and pops back up to FIG. 6. The children of (i,j) have been placed into the priority queue, and intermediate known values have been placed into the known value hash table as necessary.

Figure 8:
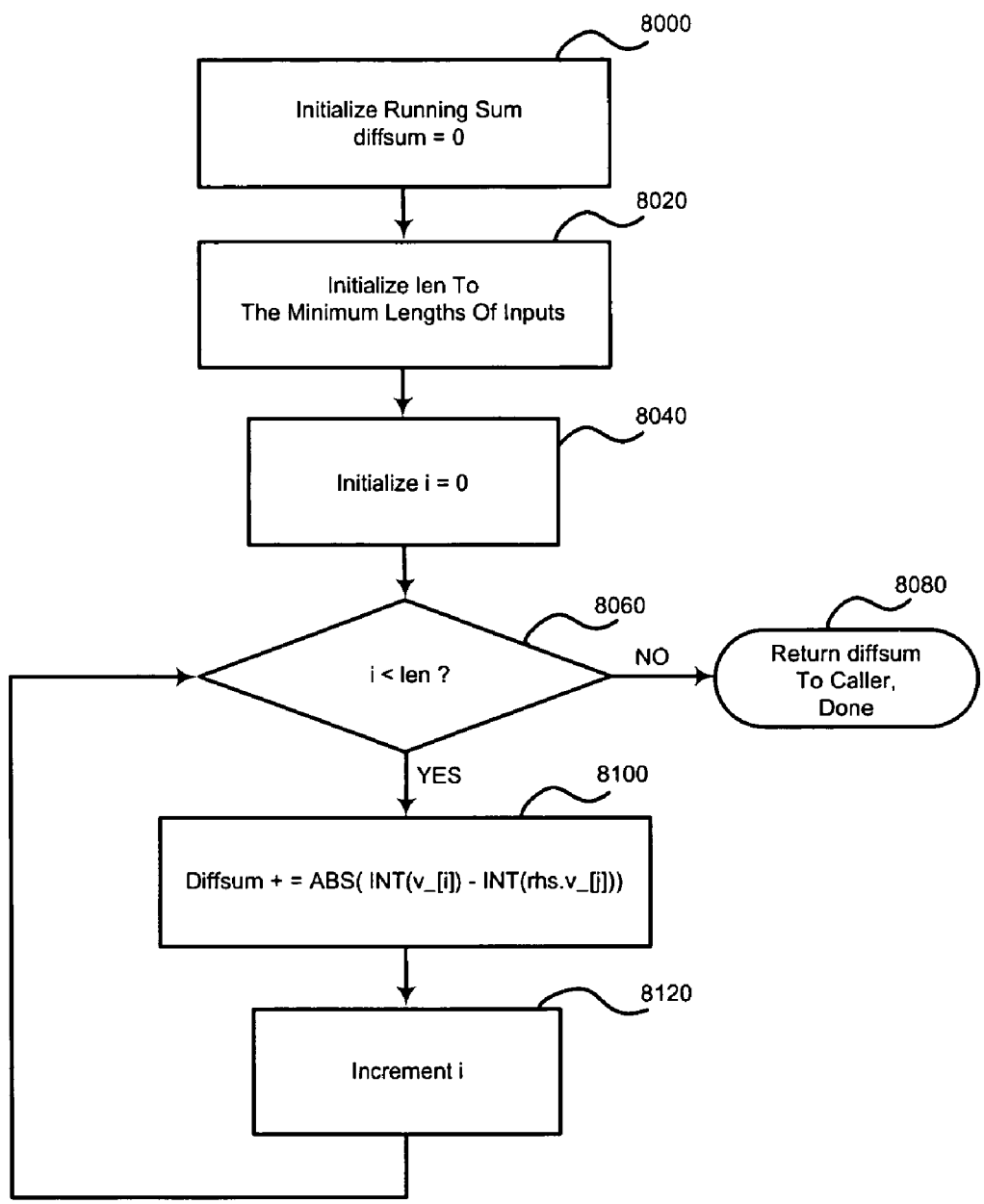
FIG. 8 is a computer implemented method to compute a heuristic value from two arrays of integers which are given as inputs.

FIG. 8 implements the heuristic computation necessary for steps 7680 and 7700 in FIG. 7D and steps 7140 and 7200 in FIG. 7A. This routine subtracts two vectors of integers typically of length 256. These vectors are generated in FIG. 3 and steps 2080 and 2100 during algorithm initialization. In order to call this routine on a coordinate pair (i,j), i is used as an index into the data structure created at step 2080, and j as an index into the data structure created at step 2100. The result of this pair of lookups is a pair of heuristic vectors that are used as inputs to this flowchart. The two input vectors contain non-negative values as they represent the count of each possible byte at a particular location in a particular file or string. They are subtracted, element-by-element, to produce a difference vector. Each element of the difference vector can be positive, negative, or zero. The absolute value of each element of the difference vector is taken, and the results are added up to obtain a non-negative number. This number is the Yameda heuristic which guides the A* search. Step 8000 initializes running sum diffsum to zero. Step 8020 initializes limits variable len to the minimum of the lengths of the input vectors. Step 8040 initializes loop variable i to 0. Step 8060 tests whether i<len. If FALSE, it exits at step 8080. If TRUE, it continues the loop at step 8100. Step 8080 returns the value of diffsum to the caller. This is the answer. Step 8100 extracts the ith element of the first vector and the ith element of the second vector and subtracts them taking care to use signed arithmetic and takes the absolute value of the result. It adds this absolute value to whatever value was in diffsum and puts the result back in diffsum. Step 8120 then increments i by 1.

Figure 9:
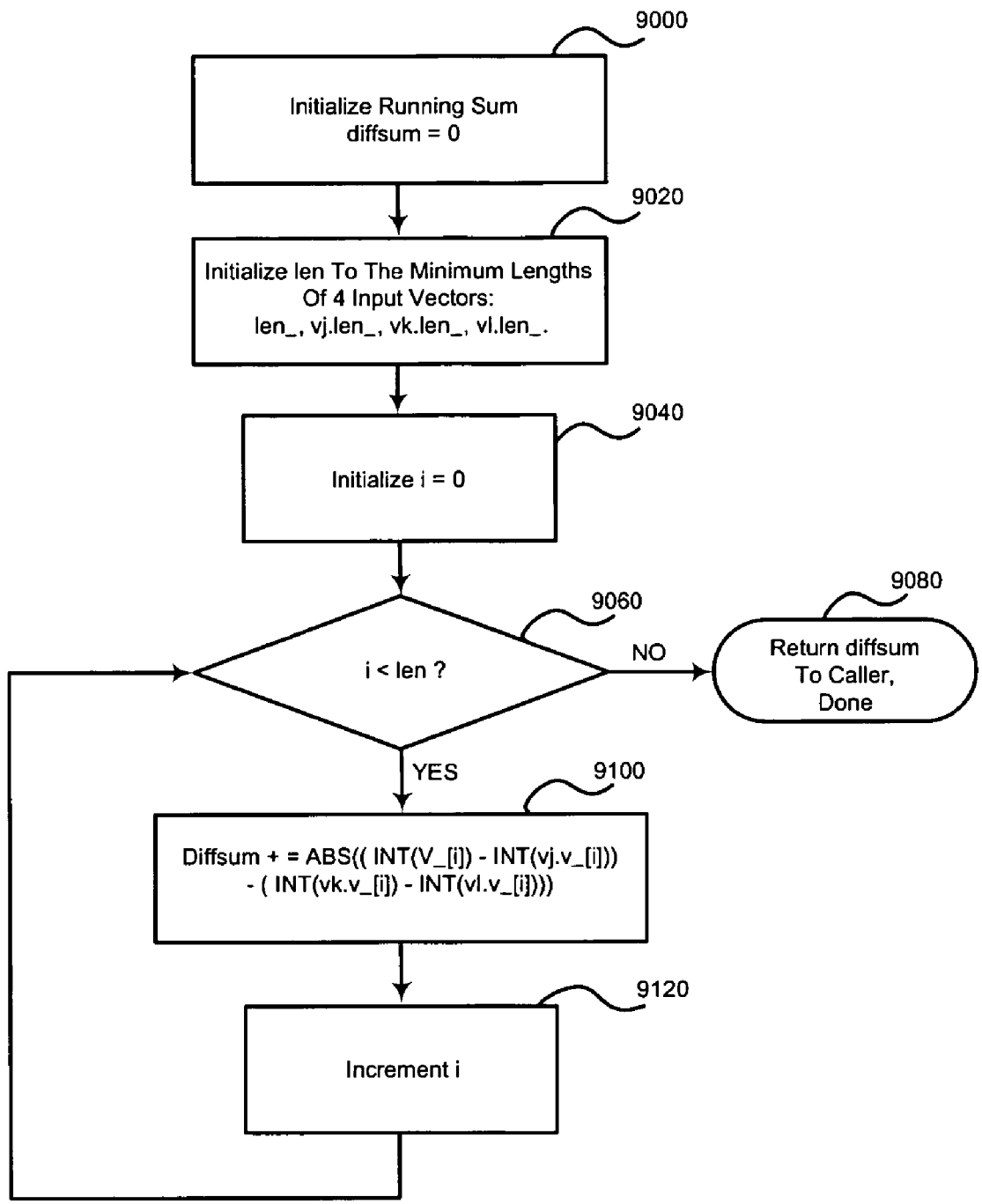
FIG. 9 is a computer implemented method to compute heuristic value from four arrays of integers which are given as inputs.

FIG. 9 implements the heuristic computation necessary for step 7580 shown in FIG. 7C. This routine subtracts four vectors of integers, typically of length 256. These vectors are generated in FIG. 3 and steps 2080 and 2100 during algorithm initialization. The idea is much the same as the flowchart in FIG. 8, but rather than computing the lower bound distance between (i,j) and (0,0) it is necessary to compute the lower bound distance between (i,j) and some arbitrary point (K,L). In this case (K,L) is treated as the "origin" rather than (0,0) and its heuristic vectors must be subtracted off first. Step 9000 initializes running sum diffsum to zero. Step 9020 initializes limit variable len to the minimum of the lengths of the 4 input vectors. Step 9040 initializes loop variable i to 0. Step 9060 tests whether i<len. If FALSE, it exits at step 9080. If TRUE, it continues the loop at step 9100. Step 9080 returns the value of diffsum to the caller. This is the answer. Step 9100 extracts the ith element of the first vector and the ith element of the second vector and subtracts them taking care to use signed arithmetic. Extracts the ith element of the third vector and the ith element of the fourth vector. Subtracts them, taking care to use signed arithmetic, subtracts the two above differences, taking care to use signed arithmetic, and takes the absolute value of the result, adds this absolute value to whatever value was in diffsum, and put the result back in diffsum. Step 9120 increments i by 1.

Figure 10:
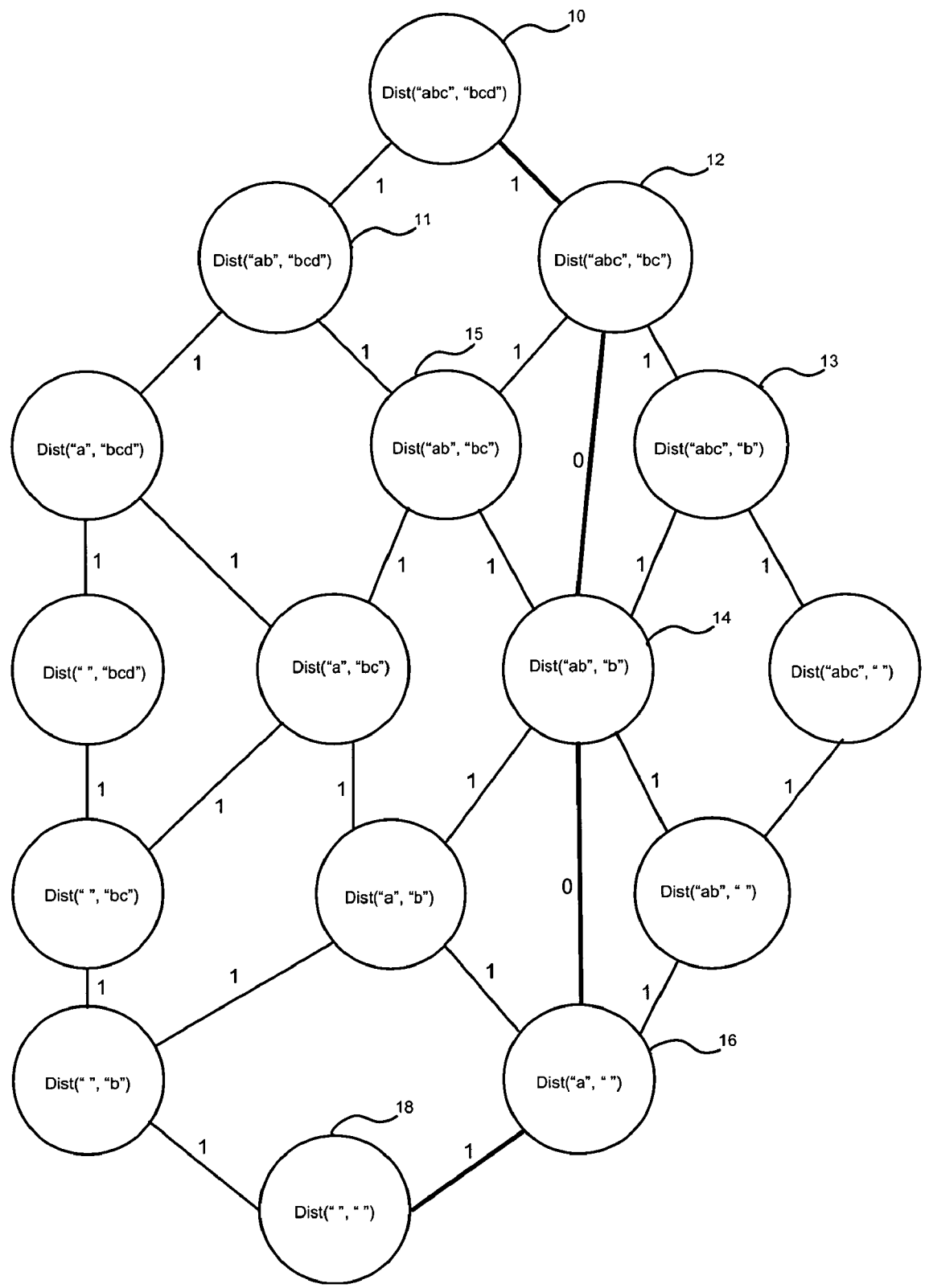
FIG. 10 illustrates an example of viewing a minimum edit distance problem comparing "abc" and "bcd" as a graph search.

FIG. 10 illustrates the minimum edit distance problem expressed pictorially as a graph, thus amenable to graph search algorithms such as A* search. The problem chosen is "abc" versus "bcd". A dynamic programming algorithm may visit all of the nodes in the graph, but a more judicious algorithm such as Dijkstra's algorithm or A* search will only choose a salient subset. The bold-faced path represents the minimum edit distance starting at node 18 Dist(" "," "). The minimum edit distance (as would be computed by any suitable algorithm) is as follows:

Insertion of "a" into the left-hand side. (symmetrically the deletion of "a" from the right-hand side);
Insertion of "b" at the end of both strings;
Insertion of "c" at the end of both strings;
Insertion of "d" into the right-hand side (symmetrically the deletion of "d" from the left-hand side);

An edge labeled with a 1 indicates that an insertion or deletion needs to be performed to move between the two connected nodes. An edge labeled with a 0 indicates that no insertions or deletions need to be performed to move between the two connected nodes, since identical characters are inserted into (symmetrically deleted from) the adjoining nodes.

In another embodiment, step 10 is the start node for the A* search and represents the whole problem. It is generated in FIG. 6 at step 6020. The last characters do not match so a penalty of 1 must be assigned on any path to its nearest neighbors Dist("ab", "bcd") and node 12. The heuristic function will push the search toward node 12. Whereas Dist("ab","bcd") must be at least 3 from the goal by the counting heuristic, node 12 (Dist("abc","bc")) must only be at least 1 from the goal. Node 12 actually has three children, but only one of them (node 14) is relevant and the algorithm proceeds to node 14 immediately. Steps 7240-7400 will perform this function. Node 14 actually has three children, but only one of them (node 16) is relevant and the algorithm proceeds to node 16 immediately. Steps 7240-7400 will perform this function. Node 16 Dist("a"," ") has only one simpler subproblem because one of the strings is empty. This is checked at step 7180. Node 18 is the goal node Dist(" "," ")corresponding to (i=0, j=0). This is checked at step 7080.

Figure 11:
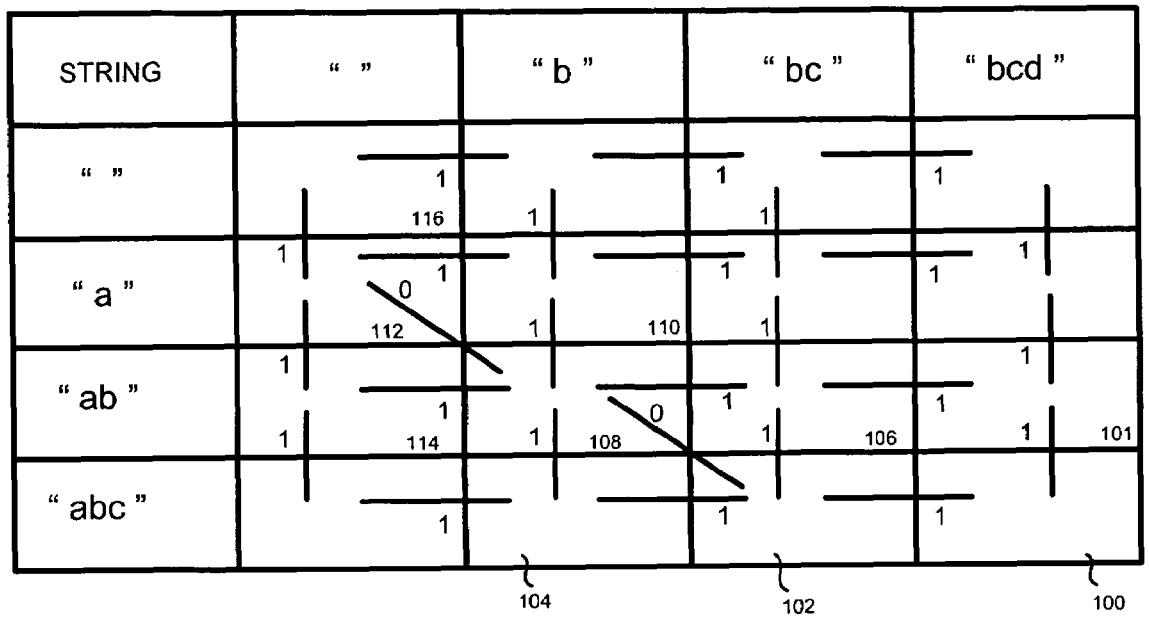
FIG. 11 illustrates the example of FIG. 10 showing the path of minimum edit distance in a table format.

FIG. 11 is a condensed form of the same problem in FIG. 10, albeit in the form of a table. The algorithm proceeds from the lower-right-hand corner, representing the whole problem, to the upper-left-hand corner, representing the comparison of the empty string versus the empty string. The children of a particular table location are always to the left of, or above, (or both), the table location. Each table entry is connected to its above neighbor, and its left neighbor, by an edge of length 1 representing an insertion or deletion. A diagonal edge of length 0 can occur, up and to the left, when the last characters in the string match. Node 100 is the start node corresponding to Node 10 of FIG. 10. Node 102 is a node along the path, corresponding to Node 12 of FIG. 10. Node 104 is a node corresponding to Dist("abc","b"). This node is not reached because from node 102 one can move diagonally, up and to the left, with impunity, and there is no other way to get there. Node 106 is a node corresponding to Dist("ab","bc"). This node is not reached because from node 102 we can move diagonally with impunity and the only other path is through Dist("ab","bcd") which is also avoided due to the heuristic cost. In a more challenging problem a node like this might be reached, however. Node 108 is a node along the path, corresponding to node 14 of FIG. 10 reached by a diagonal move from node 102 by matching. Node 114 is much like node 106, this node is not reached. Node 110, much like node 106, this node is not reached. Node 112 corresponds to node 16 of FIG. 10, reached from node 108 by a diagonal move stripping off the last character. Node 116 the goal node, reached from node 112 by an upward move. It is the only child of node 112.

FIG. 12 is similar to FIG. 11, but with the explicit edges removed to avoid clutter. The numerical computations for the actual and heuristic costs of each table entry, were it to be reached, are provided. The second column and the second row shows the heuristic vectors of counts. The shaded rectangles are reached by Yameda and the others are not.

Node 200 is the start node. The actual cost from start node is 0. The heuristic cost is 2 because the computations proceed as follows:

[a:0;b:1;c:1;d:1]−[a:1;b:1;c:1;d:0] is [a:−1; b:0; c:0; d:1]

The element-wise absolute value of [a:−1; b:0; c:0; d:1] is [a: 1; b:0; c:0; d:1]

The sum of the elements of [a:1; b:0; c:0; d:1] is 2, which is the heuristic cost.

Node 202: "1+1=2" represents an actual cost of 1 incurred by moving left from 200 and a heuristic cost of 1 incurred by subtracting [a:0;b:1;c:1;d:0] from [a:1;b:1;c:1;d:0] according to the formula. Node 204 is reached by moving diagonally from node 202 by removing the c. After a diagonal move, the heuristic and actual costs are the same. Node 206 is reached by moving diagonally from node 204 by removing the b. After a diagonal move, the heuristic and actual costs are the same. Node 208 is reached from node 206 by moving upward (which is the only place to go). The actual cost is 2, the heuristic cost is 0 (the zero-vectors are subtracted) and thus no other path needs to be searched to reach the goal node more cheaply.

FIG. 13 is a table analogous to FIG. 12, but for a different problem, "GATTACA" versus "GTTGA". FIG. 13 illustrates an application of the Yameda algorithm comparing a pair of DNA sequences with strings "GATTACA" and "GTTGA". The start node is node 300 ("GATTACA", "GTTGA"). The heuristic vectors are [G:1;A:3;T:2;C:1] and

[G:2;A:1;T:2;C:0] respectively. The heuristic value is 4 computed by taking the absolute value of the difference of the two heuristic vectors [G:1;A:−2;T:0;C:−1] as shown by the equation in FIG. 12. The path to follow is first match 'G', then insert 'A'; then match "TT"; then insert "AC"; then delete "G"; then match "A". The total number of edits, insert 'A' insert "AC" delete "G", is 4.

As luck would have it, the heuristic is completely accurate; a less-than-accurate heuristic would result in a slightly longer running time but the algorithm will degrade gracefully. In particular, the counting heuristic is guaranteed to be greater than or equal to the difference of the lengths of the two strings.

The nodes marked with an "X" in the table of FIG. 13 are not generated because the last common character of both strings must be deleted. The nodes marked with a "Z" are not generated because all the characters in the region are different. Other nodes not on the final path are generated, but are not revisited for expansion since the A* search stops when it reaches the upper-left-hand empty node 320 (" "," ").

Software Realization

The Yameda method has been realized in software in C++. Due to Yameda's implementation in an object-oriented fashion, it is possible to separate out the various pieces of functionality such as initialization, the "core" algorithm, and any potential readout of the edit script once the "core" algorithm is finished executing. This prevents the intertwining of initialization, data structures, and computation that haunts the implementation of many other algorithms.

The software will be described from the bottom up so that each section makes reference only to those entities that have already been described. This, along with the above description of the Yameda algorithm, and knowledge of the A* search algorithm and the C++ programming language is sufficient to understand the nature of Yameda fully. The source code is provided in Appendix A also in bottom-up order.

The C++ classes that make up Yameda, from the bottom up, are as follows:

The node, listed in the file "yanode.h".
This simple data structure represents a subproblem of Yameda where
i represents the location in the first string, s, and ranges from 0 to m inclusive, where m is the length of s;
j represents the location in the second string t, and ranges from 0 to n inclusive, where n is the length of t;
known cost represents cost, along the path found so far, from the starting point where s is being compared to t;
heur_cost_ is a cached copy of the result of heur(i,j) which represents the lower bound estimate between the current node and the goal node in which the empty string is being compared to the empty string.

The method yanode::operator size_t returns the total cost, which is the sum known cost and heur_cost_. By converting to an integer using this cast operator, the yanode data structure can be easily plugged in to other data structures, such as the yaprioq, using operator overloading.

The next file implements a vector of integers, listed in the file "yaintvec.h" and "yaintvec.cpp. Each yaintvec is associated with a certain substring of s or t, and will be used to keep track of the total count, within that string, of each character in the alphabet. Note that the yaintvec implements the following methods:

The constructor, which is given an alphabet size and creates an integer vector with all zeros.

The copy constructor, which is implemented and public, and instrumental in the computation of the vector of heuristics.

The [] subscripting operator, which returns a non-const reference so that the "++" operator, among others, can be applied. It is worth noting that the implementation of the subscripting operator, uses the modulus operator "%" for indexing. If each yaintvec object is created with a small "len" parameter, then the Yameda algorithm as a whole will continue to operate correctly, albeit with a different tradeoff between the time required to perform operations on yaintvec objects and the number of steps executed by the algorithm. In particular, if the alphabet size is given as 1, then the counting heuristic reduces to the length heuristic.

size_t yaintvec::operator—(const yaintvec &rhs) const which computes the heuristic function heur(s,t).

size_t yaintvec::diff4 (const yaintvec &, const yaintvec &, const yaintvec &) const which computes the heuristic function heur(s,t,u,v).

The next file implements an abstraction, "yaheurvec," which implements a set of heuristic vectors that index a given string. Two objects of this type, one for s and one for t, will be used in the Yameda algorithm. The yaheurvec consists of the following major methods:

The constructor yaheurvec::yaheurvec(const vec_t &s, size_t m, int alphasize) will compute the counting heuristic for each substring of s that has some number of characters on the left-hand-side chopped off, and the rest preserved. m is the length of the string. The heuristic vector for the empty string is the zero-vector; the heuristic vector for the first i characters of s is a copy of the heuristic vector for the first i-1 characters, but with the kth position incremented by one, where k is the integer code of the new character. In this fashion, a simple loop constitutes the constructor.

Yaheurvec::operator [] is declared and implemented. It is worth noting that the range of legal indexes is [0,m] inclusive, which means that there are m+1 elements overall. This is due to the fact that any given string of length m has m+1 substrings of interest, as the empty string is always one of them.

The next file implements priority queues, "yaprioq. This class is instantiated with a template class which can be anything for which "operator<" and "operator>", etc. are valid. In particular, it can be instantiated with T=int, for testing, or T=yanode, in which case yanode::operator size_t will implicitly convert each yanode object to an integer for the purposes of comparison. The public interface consists of the default constructor yaprioq::yaprioq( ) which generates an empty priority queue, yaprioq::operator<<which puts an object into the priority queue, and yaprioq::operator>>which extracts the least object from the priority queue. The remainder of this class is devoted to the implementation, which is a standard priority-queue/"heap" data structure that can be found in any textbook, albeit with a clean and succinct implementation.

The next file implements a hash table which is used to store the known path lengths as required by the A* search algorithm. This is a fairly standard linked data structure, implemented, by "yahashda.h". Internally, this is a hash table with linked lists, which stores "yanode" objects since three of the four fields of a "yanode" are required (only the heuristic value is not necessary). This data structure and a few others could have been written using a standard library such as Standard Template libraries, but a custom implementation was found to provide greater control over the functionality, such as whether to delete elements that are overwritten, and in this case the Standard Template Libraries version would have been cumbersome.

Finally for the source code proper, the Yameda class, performs the initialization and executes the algorithm. As mentioned earlier, an object-oriented implementation helps to separate the initialization, which is done by the constructor, from the "core" algorithm, which is performed by the method Yameda::solve, from any potential readout or post-processing algorithms that may wish to operate on the 'breadcrumbs' left behind (constructing the edit script is an exercise available to the average practitioner).

The ingredients of the Yameda class are:

The data declarations. These declarations show that the Yameda object will maintain the two strings being compared s and t, their lengths m and n respectively, the set of known path lengths, known, of type yahashda, and two vectors of heuristics heur_s_ and heur_t_ which are both of type yaheurvec. The remaining data are for keeping track of metrics, and are not an integral part of the algorithm.

The constructors, which populate these data structures (the call to populate is vestigial as it is #ifdefd out. Here it is only necessary to populate the members of the Yameda object using their constructors: s and t and m and n are simply the inputs to the constructors and their lengths; known is initialized to be empty, but to hold 101*(m+n) items initially which is normally enough to execute the algorithm to resize the hash table, and heur_s_ and heur_t_ are initialized to create a vector of heuristics for s and t in the fashion described above.

The methods Yameda::solve and Yameda::put_children execute the core Yameda algorithm. Yameda::solve returns the minimum edit distance between the two strings. The net result is not only this, but also known is populated and hence can be used for later read-out before Yameda::~Yameda, the destructor, is called.

The A* search algorithm is used, with each node generating children (*Yameda::put_children*) in the fashion described above. As described above, the heuristic used for the A* search is the counting heuristic. Furthermore, within Yameda::put_children is the method for skirting around the perimeter of a region whose members are all different. It can be proven that only two children need to be placed into the priority queue: for "1234abc" vs. "1234pdq", the two children are "1234" vs. "1234pdq" and "1234abc" vs. "1234". However, it is believed that the Yameda algorithm would benefit most from a future implementation where the perimiter in its entirety is traversed by this section of code (lines 175 through 238), either by putting it in known value if it is on the "lower" or "right-hand" border of the region assuming that it does not overwrite any better values, and putting it in pq if it is in the "upper" or "left" region. Suffice it to say that this section of code does its job, but future improvements that achieve the stated algorithm will also be placed under claim.

A few benchmarks have been run, taking the byte-by-byte differences of different versions of the Yameda.cpp source code and other source codes, as well as for 40,000 bytes of nematode DNA from *C. elegans* that was edited by hand. In most or all of the benchmark runs where "natural" editing had occurred, the number of steps counted was less than m+n using the counting methodology in the software. Granted, this counting method does not count traversals of common subsequences, but it shows that for such cases the running time is nearly linear, especially in practice.

One challenging case is the comparison of the Yameda executable [sic] versus a previous version. Since two such executables are not created by "natural" editing, but rather by a similar process, the differences are large, scattered, and essentially patternless. In this case, it required 23022 steps over M+N, or 2.3E-5*M*N steps (over M+N) to execute, for 976 bytes of difference. For a 40,000 byte file, ND is approximately 40 million and MN is approximately 1.6 billion. Thus, even though the step counting is gerrymandered, this is a significant improvement. Correctness has been verified for small strings by inspection, and for large edits by knowing the nature of the edits and/or by comparing s versus t, and then t versus s to see if the result is the same.

The remainder of this application will cover the variations and usages that can be envisioned for Yameda. Sometimes the distinction between a variation and a usage will be blurred, and thus these will be listed together in a fashion where no variation or usage depends upon any one that is above it.

Variations, Improvements, and Usages

The invention is understood to include as follows:

Any improvement to the perimeter-traversing algorithm in Yameda::put_children of Yameda.cpp which achieves the result as stated in this application.

Any usage of Yameda which specifies an alphabet that is smaller than the "natural" alphabet of the problem. The handling of this is already implemented with the "alphasize" parameter to the various constructors, and one need only put in a small number such as "4" instead of "256" which will make each heuristic evaluate faster, but will slow down the algorithm because the heuristic is less accurate. This is still useful for "real-time" performance tuning, however.

Any replacement of the hash table with a more suitable data structure such as a two level tree with each level being of size sqrt(M)*sqrt(N).

Any enhancement with the goal of reading out the edit script.

Any usage of the rolling-checksum as in "rdiff" (described under prior art) for pre-synchronization of Yameda. Here, the blocks can be quite large (1-2K, say) as Yameda is perfectly capable of comparing 1-2K files quickly.

Any generalization of the algorithm to find the minimum edit "weight" between sequences of data where each datum is a vector, in general, of continuous variables, in general. Under this view, the minimum edit distance algorithm which compares files byte-by-byte operates over a sequence of vectors of length 256, each with a "1" at the index represented by the character value. Generalizing, it may be possible to use continuous values such as red, green, and blue levels, and then it will be possible to use a Yameda variant to perform delta compression of one scan line in a picture against the next (assuming no other compression has taken place; other variants will blend Yameda with compression).

A specialization of the above vector-valued continuous-quantity algorithm to a scalar-valued continuous-quantity algorithm which may be useful, for instance, in speech recognition.

The usage of Yameda over an alphabet of two elements: 1 and 0, to compare binary data bit-by-bit.

The usage of Yameda in bit-by-bit mode to perform delta compression for quantities that have been individually compressed by some other means, perhaps involving arithmetic coding, first. For instance, a scan line in a picture may be compressed using arithmetic coding, and the next one compressed the same way, and Yameda can be used for delta compression of the results. Or, two similar files could be compared with "gzip" and Yameda used for the result.

The usage of Yameda to establish the pedigree of organisms given their DNA.

The usage of Yameda to perform delta compression for transmission over the internet, for the same purpose as the "xdelta" algorithm. This will require the server to keep a [delta-compressed] version of old versions of, for example, a web page, while the client transmits a unique identifier (perhaps in the URL, such as length, [server] timestamp, and checksum). Then, only the minimum edit needs to be sent over the Internet.

The usage of Yameda, as above, to perform delta compression to conserve space on secondary storage.

The usage of Yameda to compress motion pictures by comparing one frame against the next, with or without the aid of other forms of compression before or after Yameda is used.

Yameda is much more likely to be capable of finding the differences, at byte-by-byte granularity between two files or other sequences of data in nearly linear time. Yameda can be used for all the same purposes as diff, albeit in a far more precise and useful fashion. In particular, newer data formats such as HTML, XML, and RTF (rich text format), as well as older forms of text such as software source code, are not really parsed line-by-line, but rather have a character-by-character flavor in their syntax. Some of these purposes include: display on the user's console, delta compression of different versions of the files for the purpose of data storage and transmittal, automated construction of a new version of the file from those edited by two different users assuming that a common ancestor can be found and establishing a pedigree of organisms from DNA sequences. Yameda solves DNA sequences in a time that is linear in the size of the input. Thus, it is possible to begin, for Yameda, to find the minimum edit distance on a character-by-character basis (or base-by-base basis, in the case of DNA) as opposed to line-by-line comparison. Thus, the application of the algorithms are found in solving strings or sequences of integers such as fixed size alphabets, characters, symbols, DNA sequencing, bioinformatics, text processing, and web searching, etc.

Part of the present disclosure of this application is the software source code, in the C++ programming language, which is an example of Yameda. This software was compiled and executed on LINUX. The software source code is on the accompanying CD-ROM labeled Yameda and listed below as Appendix A.

The filenames are:
YAMEDA.H
YAHEURVEC.H
YAINTVEC.H
YANODE.H
YAHASHDA.H
YAPRIOQ.H
YAMEDF.CPP
YAMAINDA.CPP
YAMEDA.CPP
YAHEURVEC.CPP
YAINTVEC.CPP
YAPRIOQ.CPP
YAHASHDA.CPP

What is claimed is:

1. A computer implemented method to compute a two way data structure heur (s, t), wherein s and t are strings or sequences of integers; comprising the steps of:
   (a) given a range of integers i from 0 to a −1, wherein a is an alphabet size;
   (b) given a previously-computed data structure input $C_{i,s}$ which stores the number of occurrences of the integer i in a string or sequence of integers s;
   (c) given a previously-computed data structure input $C_{i,t}$ which stores the number of occurrences of the integer i in a string or sequence of integers t;
   (d) computing the sum of the absolute values of the difference for all integers i between data structure inputs $C_{i,s}$ and $C_{i,t}$ by the following method:
   (d1) initializing a variable diffsum to 0;
   (d2) computing the absolute value of the difference between data structure inputs $C_{i,s}$ and $C_{i,t}$, and adding the absolute value to the variable diffsum for all integers i from 0 to a −1; and
   (d3) assigning the variable diffsum in step (d2) as the value of the data structure heur (s, t), wherein the steps in (d) is expressed as the following equation:

$$\text{heur}(s, t) = \SIGMA_{i=0}^{a-1} | C_{i,s} - C_{i,t} |.$$

2. The method of claim 1, wherein the integers i in the range 0 through a−1 are to be interpreted by the ASCII convention.

3. The method of claim 2, wherein a, the alphabet size is 256, and hence corresponds to individual bytes in a file.

4. The method of claim 1, wherein the strings or sequences of integer s and t correspond to characters or symbols.

5. The method of claim 1, wherein the data structure heur (s, t) computation is applicable as a plug in subroutine to an optimization or search algorithm.

6. A computer implemented method to generate a data structure heur_, and an integer m, from a string or sequence of integers s, comprised of the steps of:
   (a) given alphasize, a positive integer, wherein alphasize is the size of the alphabet;
   (b) given m an integer, wherein m is the length of the string or sequence of integers s, wherein the string or sequence of integers s is further comprised of elements s[i], wherein each of the elements s[i] is an integer from 0 to alphasize-1 inclusive, and i is an integer from 0 to m−1 inclusive;
   (c) copying the integer m;
   (d) generating the data structure heur_ wherein the data structure heur_ is an array of elements heur_[i], wherein i is an integer from 0 to m inclusive, wherein each element heur_[i] is another array of alphasize elements heur_[i][a], wherein a is an integer from 0 through alphasize-1 inclusive, and heur_[i][a] is an integer;
   (e) initializing for all a from 0 through alphasize-1 inclusive, and i=0, each of the elements heur_[i][a] to zero;
   (f) looping for all i from 1 to m_ inclusive, do:
   (f1) copying element heur_[i-1] onto heur_[i];
   (f2) incrementing elements heur_[i][a], wherein a is s[i-1]
   (g) returning m and heur_ to the caller.

7. The method of claim 6, wherein the data structure heur_ is a heuristic vector.

8. A computer implemented method to compute a four way heuristic value heur (s, t, u, v), wherein s, t, u, and v are strings or sequences of integers; comprising the steps of:
   (a) given a range of integers i from 0 to a −1, wherein a is the alphabet size;
   (b) given a previously-computed data structure input $C_{i,s}$ which stores the number of occurrences of the integer i in a string or sequence of integers s;

(c) given a previously-computed data structure input $C_{i,t}$ which stores the number of occurrences of the integer i in a string or sequence of integers t;

(d) given a previously-computed data structure input $C_{i,u}$ which stores the number of occurrences of the integer i in a string or sequence of integers u;

(e) given a previously-computed data structure input $C_{i,v}$ which stores the number of occurrences of the integer i in a string or sequence of integers v;

(f) computing the sum of the absolute values of the difference of a first difference and a second difference for all integers i, wherein the first difference is between data structure inputs $C_{i,s}$ and $C_{i,u}$ and the second difference is between data structure inputs $C_{i,t}$ and $C_{i,v}$, wherein the result is computed by the following method:

(f1) initializing a variable diffsum to 0;

(f2) looping for i from 0 to a−1, including:

(f2a) computing the first difference between data structure inputs $C_{i,s}$ and $C_{i,u}$;

(f2b) computing the second difference between data structure inputs $C_{i,t}$ and $C_{i,v}$;

(f2c) computing the sum of the absolute values of the difference between the first difference in step (f2a) and the second difference in step (f2b), and adding the sum to the variable diffsum for all integers i from 0 to a−1; and (f3) returning the variable diffsum created in step (f1) updated in step (f2c) as the value of the computation heur (s, t, u, v), wherein the steps in (f) is expressed as the following equation:

heur $(s, t, u, v)$=.SIGMA . . . sub.$i$=0.sup.$a$−1.vertline.$(C_{i,s}-C_{i,u})-(C_{i,t}-C_{i,v})$.vertline.

9. The method of claim 8, wherein the integers i in the range 0 through a−1 are to be interpreted by the ASCII convention.

10. The method of claim 9, wherein a, the alphabet size is 256, and hence corresponds to individual bytes in a file.

11. The method of claim 8, wherein the strings or sequences of integers corresponds to characters or symbols.

12. The method of claim 8, wherein the four way data structure heur (s, t, u, v) computation is applicable as a plug in subroutine to an optimization or search algorithm.

13. The method of claim 8, wherein the four way data structure heur (s, t, u, v) computation provides the lower bound value for the optimization or search algorithm to eliminate redundant paths for the graph search between strings or sequences of integers s and t.

14. The method of claim 8, wherein the four way data structure heur (s, t, u, v) computation is applicable as a plug in subroutine to the Dijsktra search algorithm.

15. The method of claim 1, wherein the length of time required to compute the previously-computed data structures inputs $C_{i,s}$ and $C_{i,t}$ are linearly dependent on the length of the strings or sequences of integers s and t respectively.

16. The method of claim 8, wherein the length of time required to compute the previously-computed data structure inputs $C_{i,s}$, $C_{i,u}$, $C_{i,t}$ and $C_{i,v}$ are linearly dependent on the length of the strings or sequences of integers s, u, t and v respectively.

17. The method of claim 8, wherein the strings or sequences of integers s and t are also known as parent strings s and t, wherein strings or sequences of integers u and v are also known as children strings u and v, wherein the children strings u and v are generated from the parent strings s and t.

18. A computer implemented method to compute the minimum edit distance between strings or sequences of integer s and t using the A* search algorithm, comprising the steps of:

(a) given alphasize, a positive integer, wherein alphasize is the size of an alphabet;

(b) given integers m and n, wherein m and n are the lengths of the strings or sequences of integers s and t, wherein s and t are further comprised of elements s[i] and [j] respectively, wherein each of the elements s[i] and t[j] is an integer from 0 to alphasize−1 inclusive, wherein i is an integer from 0 to m−1 inclusive and j is an integer from 0 to n−1 inclusive;

(c) generating from the string or sequence of integers s, a data structure heur_s_, wherein heur_s_ is further comprised of elements heur_s_[i], wherein i ranges from 0 through m inclusive, wherein each element heur_s_[i] is an array comprised of alphasize elements heur_s_[i][a], wherein a ranges from 0 through alphasize-1 inclusive, and heur_s_[i][a] is an integer;

(d) generating from the string or sequence of integers t, a data heur_t_, wherein heur_t_ is further comprised of elements heur_t_[j], wherein j ranges from 0 through n inclusive, wherein each element heur_t_[j] is an array comprised of alphasize elements heur_t_[][a], wherein a ranges from 0 through alphasize-1 inclusive, and heur_t_[][a] is an integer;

(e) generating from the above given integers m and n, an empty hash table known values with a plurality of nodes, wherein each node in the known values hash table is further comprised of a key (i,j) to identify the location of the node in the known values hash table, a known cost and a heuristic value;

(f) generating an empty priority queue with a plurality of nodes with the same composition as the nodes described in the known values hash table;

(g) Inserting a node startnode into the priority queue, wherein the startnode is computed by the steps of:

(g1) designating the key (i,j) to identify the location of the startnode, wherein i=m and j=n;

(g2) assigning to the startnode a known cost of zero;

(g3) computing the heuristic value of the startnode from the data structures heurs_s_[m] and heur_t_[n] generated in steps (c) and (d);

(h) looping until the node at the key (i=0,j=0) has been reached, as determined by querying the known values hash table, by the steps of:

(h1) removing of a least cost node N from the priority queue, wherein N has the least total cost and wherein the total cost is the sum of the known cost and the heuristic value of N;

(h2) querying the known values hash table to determine whether the node at the location key (i,j) is present, wherein i and j are read from N, and whether the known cost of the node is less than or equal to the known cost of N; If so, continue looping at step (h);

(h3) inserting N into the known values hash table at location key (i,i);

(h4) inserting necessary children nodes of N into the priority queue and updating the known values hash table, wherein the children nodes are generated from N by a node generation method;

(i) returning to the caller the known cost from the known values hash table at key (i=0,j=0) as the minimum edit distance.

* * * * *